(12) United States Patent
Brown

(10) Patent No.: US 9,714,738 B1
(45) Date of Patent: Jul. 25, 2017

(54) CONTAINER STORAGE APPARATUS AND SYSTEM

(71) Applicant: Daniel Everett Brown, Chowchilla, CA (US)

(72) Inventor: Daniel Everett Brown, Chowchilla, CA (US)

( * ) Notice: Subject to any disclaimer, the term of this patent is extended or adjusted under 35 U.S.C. 154(b) by 0 days.

(21) Appl. No.: 15/134,354

(22) Filed: Apr. 20, 2016

Related U.S. Application Data

(63) Continuation-in-part of application No. 15/060,166, filed on Mar. 3, 2016.

(51) Int. Cl.
| | |
|---|---|
| *F16M 13/02* | (2006.01) |
| *A47B 81/00* | (2006.01) |
| *A47B 96/06* | (2006.01) |
| *A47B 96/07* | (2006.01) |
| *F16M 11/04* | (2006.01) |
| *A47B 51/00* | (2006.01) |

(52) U.S. Cl.
CPC .......... *F16M 13/027* (2013.01); *A47B 81/00* (2013.01); *A47B 96/067* (2013.01); *A47B 96/07* (2013.01); *F16M 11/041* (2013.01); *A47B 2051/005* (2013.01)

(58) Field of Classification Search
CPC .... F16M 13/027; F16M 11/041; A47B 96/07; A47B 96/067; A47B 81/00; A47B 2051/005; A47F 5/08; A47F 5/0838
USPC .............. 211/1.3, 7, 79, 85.17, 85.19, 85.21, 211/85.23, 85.29
See application file for complete search history.

(56) References Cited

U.S. PATENT DOCUMENTS

| | | | | |
|---|---|---|---|---|
| 2,865,697 A | * | 12/1958 | Staley .................... | A47D 1/008 108/25 |
| 3,433,446 A | * | 3/1969 | Meder ...................... | A47F 5/08 248/316.3 |
| 3,528,718 A | * | 9/1970 | Braun .................... | A47B 77/18 312/270.3 |
| 8,622,493 B2 | * | 1/2014 | Roeck ................... | A47B 77/18 312/330.1 |
| 2013/0199016 A1 | * | 8/2013 | Found ...................... | A47F 5/08 29/428 |

OTHER PUBLICATIONS

The Family Handyman, "Create a Sliding Storage System on the Garage Ceiling", Internet, Feb. 29, 2016, United States.

* cited by examiner

*Primary Examiner* — Korie H Chan
(74) *Attorney, Agent, or Firm* — Richard A. Ryan

(57) ABSTRACT

An apparatus and system for removably storing storage containers in an area, such as a garage or shed, having one or more overhead area supports, such as a joist, ceiling or the like, so as to position the storage containers below the area supports and above the floor of the area. The apparatus has a container engaging section that holds the container and a mounting section that mounts the apparatus to the area supports. The container engaging section has a static support member and a dynamic support assembly that define a container space for a container. The static support member engages one lip of the container. The dynamic support assembly has a plurality of dynamic supports that move along a frame member, each dynamic support has a biasing mechanism that biases a lip engaging device to engage an opposing lip of the container to secure the container in the apparatus.

19 Claims, 13 Drawing Sheets

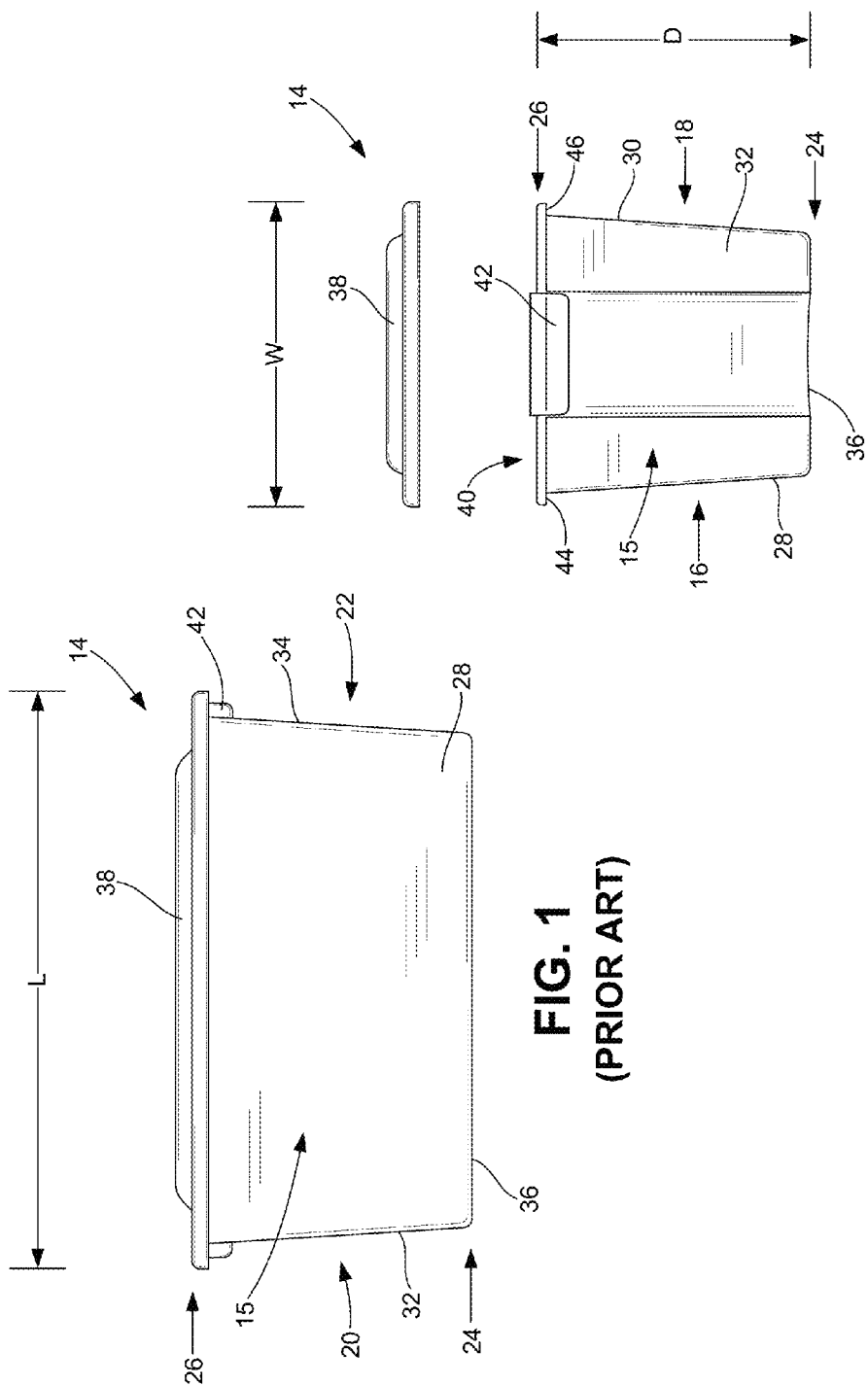

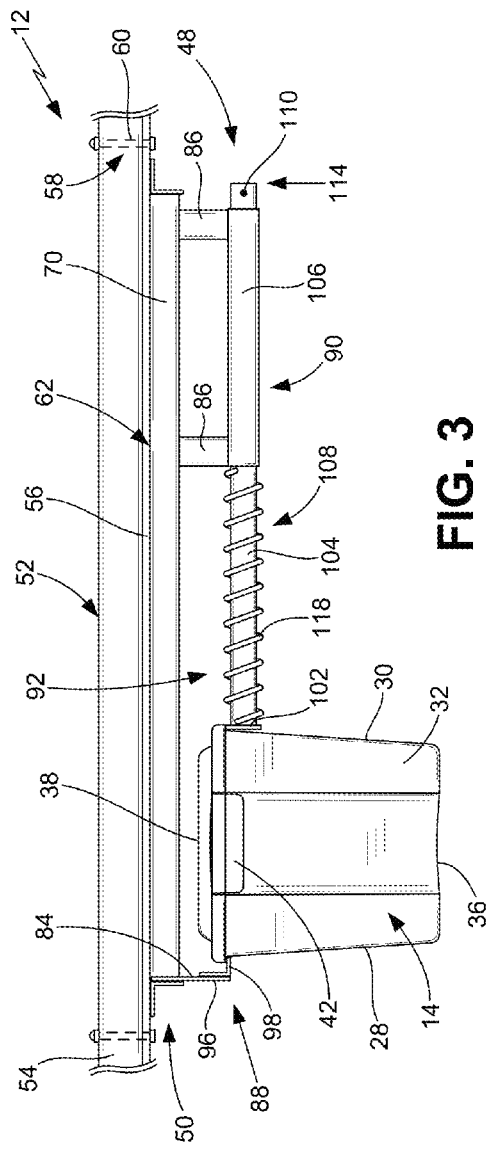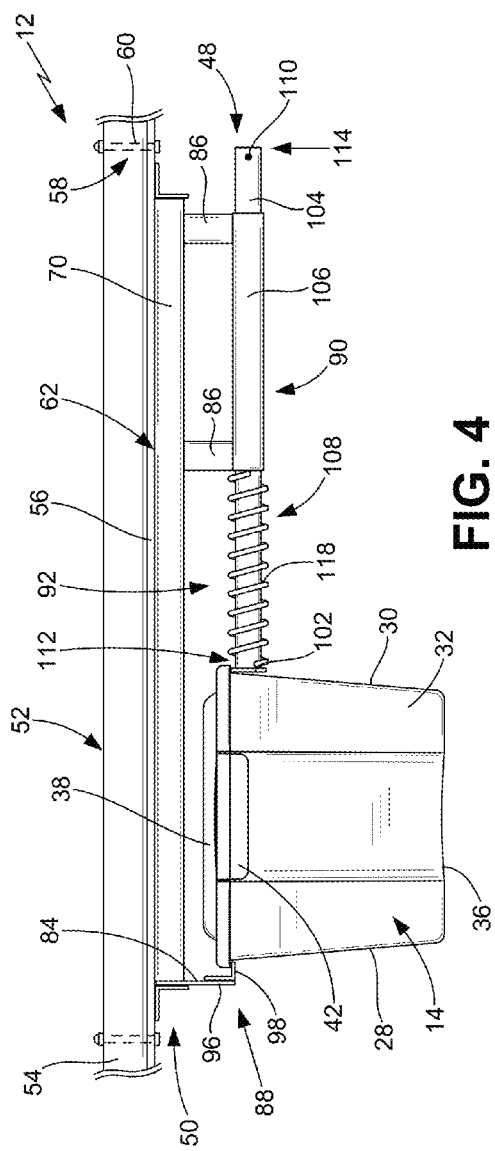

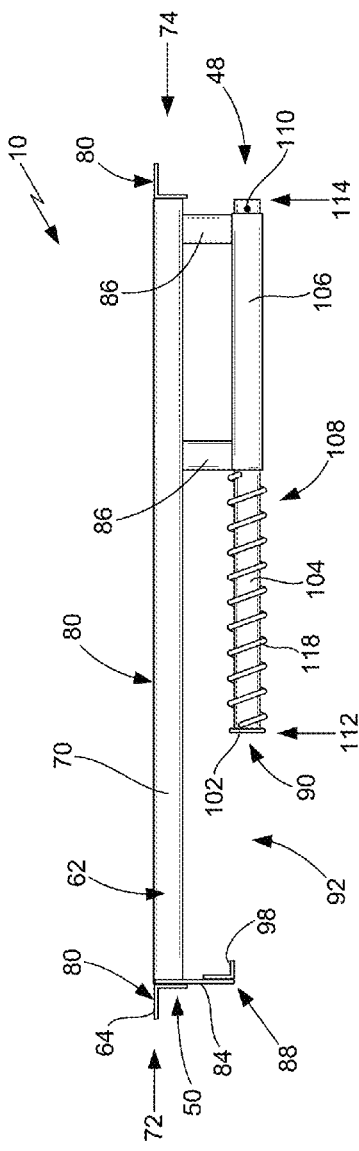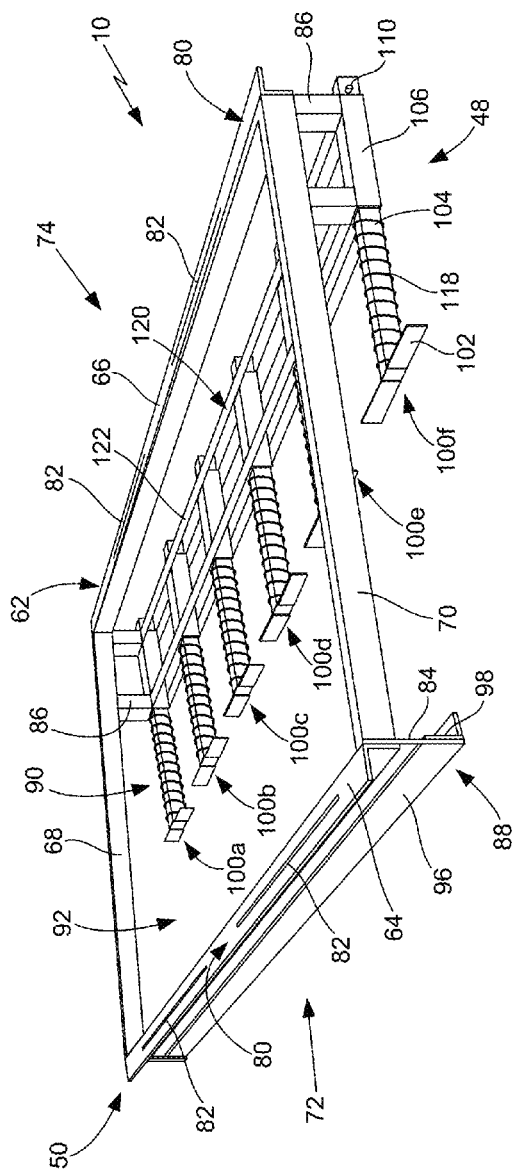

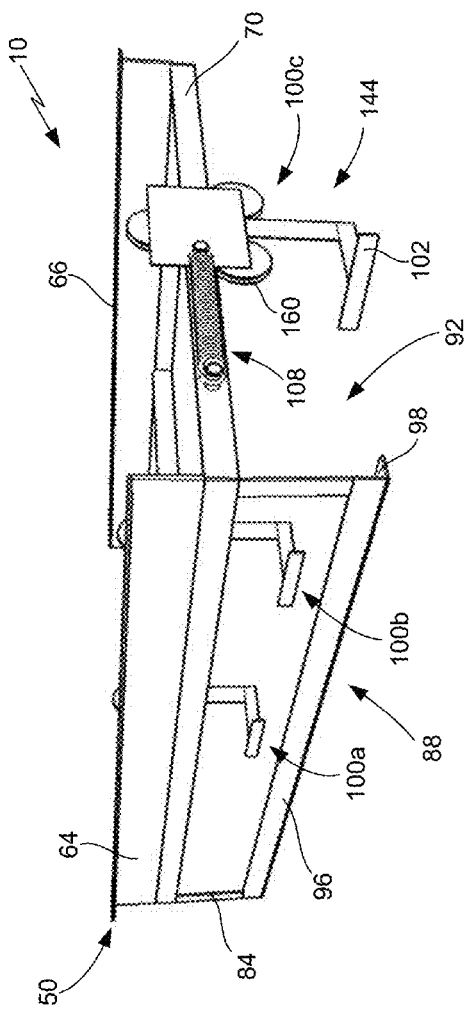
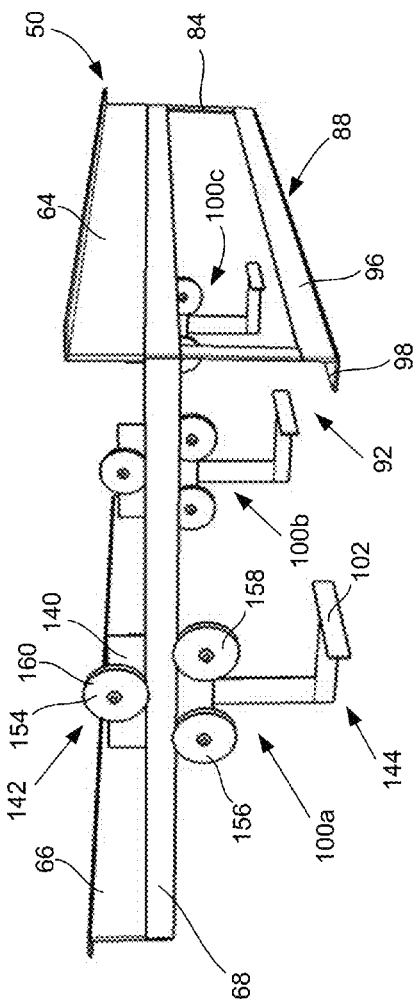
FIG. 16
FIG. 17

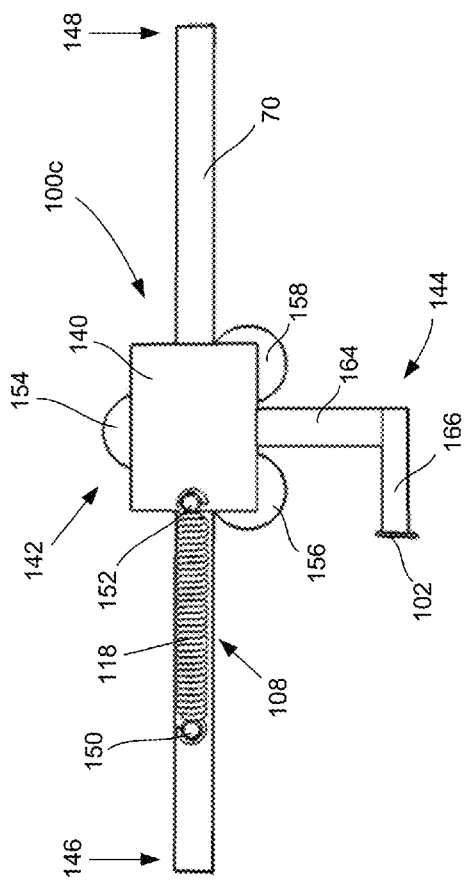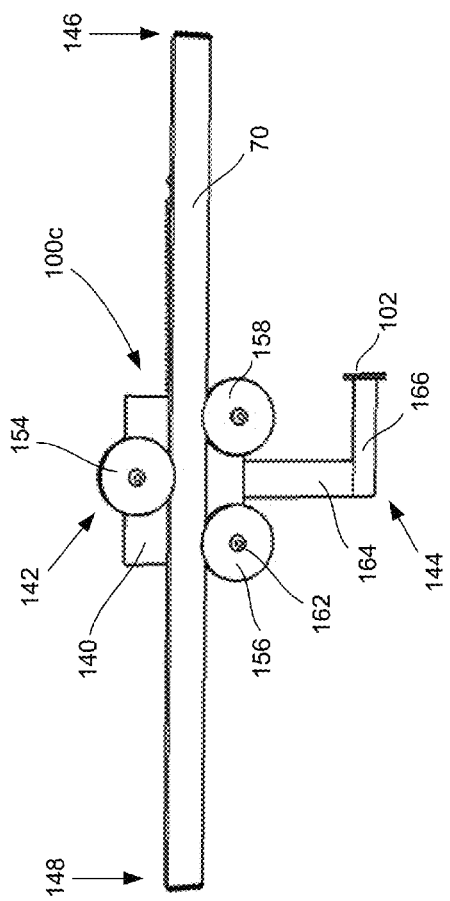

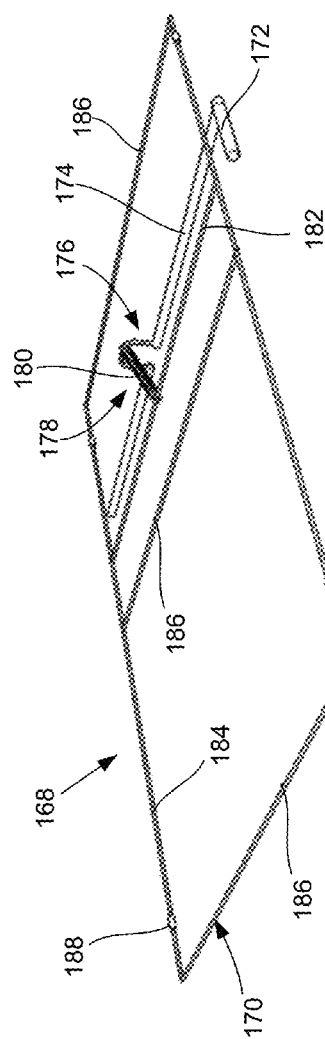
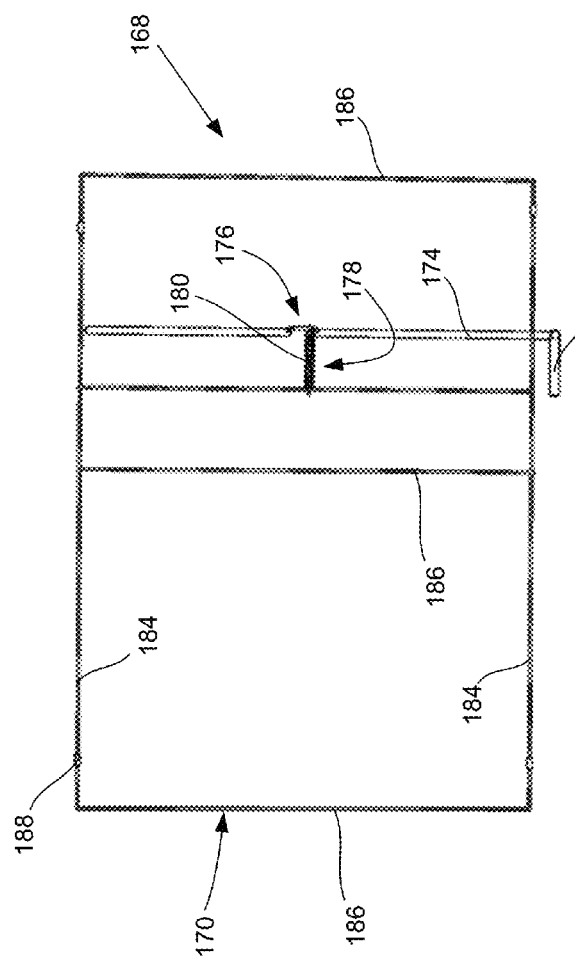

CONTAINER STORAGE APPARATUS AND SYSTEM

CROSS-REFERENCE TO RELATED APPLICATIONS

This patent application is a continuation-in-part of U.S. patent application Ser. No. 15/060,166 filed Mar. 3, 2016.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems that are utilized to store containers. In particular, the present invention relates to such storage apparatuses and systems that are configured to removably store one or more containers in a manner which allows a person to easily place containers in the apparatus or remove one of the containers from the apparatus. Even more particularly, the present invention relates to such container storage apparatuses and systems that are configured to store different sizes of containers at the same time.

B. Background

Many people utilize storage containers to store items, particularly a plurality of items that would otherwise be loose in a closet, garage, room or other area. Typically, but not always, the items which are stored in a storage container are items that the person does not need to have access to on a daily or even regular basis. For instance, items commonly stored in a storage container may include Christmas or other holiday decorations, camping gear, tools, hobby or craft materials, family memory items, old or seasonal clothes, school papers and the like. These storage containers, and the items stored therein, are often stacked or otherwise placed in a garage or storage shed in a manner where they are intended to be at least generally out of the person's way of using the garage or storage shed for storing other, typically larger, items such as vehicles, lawnmowers, bicycles and the like. Unfortunately, as generally well known by persons who have and utilize storage containers, the containers are often in the way of what he or she needs to accomplish or to access in the location.

The typical storage container has a container body with one or more sidewalls and bottom wall and a lid that is secured to the container to define an interior chamber where the items are stored. A typical storage container has a plurality of sidewalls that are configured in a square or, perhaps more commonly, a rectangular shape. The lid may be of the type that is removably attached to the container body or of the type that is pivotally attached to one or more of the sidewalls. Storage containers may be made of a wide variety of materials, with hard plastic perhaps being the most commonly utilized material. One type of storage container is commonly referred to as a "storage tote" or simply a "tote". Storage totes are typically made out of hard plastic and are rectangularly shaped. Some storage totes have a removable lid that snaps onto the top of the sidewalls. Others have a pair of hinged lid members that pivot closed to form the lid or open to allow access to the interior chamber. One feature of storage totes is that they are generally structured and arranged with sloping sidewalls that result in a smaller cross-section near the bottom wall than the top of the sidewalls so they may be easily stacked on top of each other. Another feature of storage totes is that they have an overhanging lip on the top of at least two of the opposing sidewalls, often the long sidewalls.

As set forth above with storage containers in general, storage totes can be relatively easily stacked on the floor of a garage or a shed. However, many people prefer to place the storage totes above the floor so the floor can be utilized to park a car, stand a bicycle, have a workshop and the like and to be able to more easily move around inside the garage or shed. One manner of supporting the storage totes or other containers above the floor is to place the storage containers on one or more shelves which are either freestanding or securely attached to the walls of the garage or shed. As well known, the freestanding shelves also take up some of the same floor space, although generally less than the storage containers themselves, that would be lost to stacking the containers on the floor. Shelves that are attached to the wall are generally either not adequate for supporting the weight of the containers and the items stored therein or they require a relatively complex and well-built shelving system to support the containers. Another common storage system for storage totes and other storage containers is to place the storage totes on a "drop-down" platform that is, typically, supported from the ceiling or roof of the garage or shed. As with the wall-attached shelves, any platform that will be supporting a plurality of storage containers must be sufficiently well-built to be able to safely support the anticipated load from the containers and the items stored in the containers. Another limitation with platform storage systems, particularly those where one or more layers of containers may be placed more than one row deep, is that when a person wants or needs certain items in a container he or she may have to move multiple containers in order to get to the desired container. This difficultly can be somewhat compounded by the fact that most platform systems require the user to stand on a ladder or other apparatus when placing, moving or removing containers from the platform.

A more recent innovation with regard to storing storage containers, particularly storage totes, is the use of an "I-beam" storage system comprising a pair of spaced apart I-shaped support members (though L-shaped and Z-shaped) members can also be utilized). The I-shaped support members have an upper flange that is attached to the ceiling, roof or roof joists and a lower flange that is utilized to removably support the storage containers. The two support members are supported from above in a manner such that the inwardly facing lower flanges thereof are spaced apart a distance selected so a lip on each of the opposing sides of the tote container will be supported by one of the inwardly facing lower flanges of the I-beams. In effect, the facing lower flanges of the two I-beams function as rails on which the opposite facing lips of one or more storage totes are slid onto and supported. As will be readily appreciated by persons who are familiar with I-beam systems, the use of the system requires careful positioning of the two I-beam support members so that the inwardly facing lower flanges are properly spaced apart from each other to receive the outward extending lips of the storage totes, which typically only extend approximately an inch or so from the sidewalls. If the two support members are too close, the totes will not fit between the lower flanges of the support members. If the two support members are too far apart, the lower flanges will not be able to support the totes. As such, a person installing an I-beam system, or like support members, must carefully measure the distance between the two lips of the storage totes and carefully position the support members on the ceiling, roof or roof beams.

While the above support member systems have significant benefits with regard to positioning the storage totes and like containers off of the floor and generally out of the way, they do have limitations that have prevented their wide use. One major limitation of these systems, no matter whether the support members are I-shaped, L-shaped or Z-shaped, is that once the pair of support members are in place, the system can only be utilized for the particular width of storage tote for which the spacing was measured. This either requires the person to have totes with all of the same width, which is not typical due to different manufactures having different sizes, or to purchase a new set of totes that are all of the same size. Another limitation to such systems is that once a plurality of totes are placed on the inwardly facing lower flanges of the support members, the user will usually have to remove one or more of the totes to get to the tote in which the items he or she wants are stored. This requires the person to slide off each of the "wrong" totes to get to the "correct" tote and then place all of the removed totes back onto the support members. Depending on the number of totes being supported by the support member system, this could take considerable effort if the desired tote is positioned in a location where there are many other totes that must first be removed. Another limitation for such systems is that the I-beams must be positioned where there is sufficient space at one end of the system to place the containers on the I-beams. If the both ends of the I-beam system are too close to a wall or other structure, the system will not work because a person will not be able to place containers on the I-beams.

What is needed, therefore, is an improved apparatus and system for receiving and storing storage containers that overcomes the limitations and solves the issues with regard to presently available container storage apparatuses and systems. More specifically, what is needed is an improved storage apparatus and system that is structured and arranged to support a plurality of storage totes or like containers that allow different sized containers to be placed in the same apparatus, allow a person to more easily remove one particular container from a plurality of containers stored in the apparatus and allows the system to be placed close to a wall or other structure. The improved storage apparatus and system should be configured to removably support a plurality of tote or like containers that each have outwardly disposed lips on at least opposite facing sidewalls of the container. The apparatus should be structured and arranged to support the tote containers by the lips thereof. The improved apparatus and system should be structured and arranged to be supported by the ceiling, roof or roof joists such that the storage totes or like containers are positioned off of the floor of the garage, shed or other area, including closets or other rooms inside of a house or other structure. Preferably, the new storage apparatus and system should be relatively easy to install, easy to use and inexpensive to manufacture.

SUMMARY OF THE INVENTION

The container storage apparatus and system of the present invention provides the benefits and solves the problems identified above. That is to say, the container storage apparatus and system of the present invention is structured and arranged to support a plurality of storage totes or like containers that have outward extending lips on opposite sidewalls of the container by the engaging the opposite side lips of each container. The new apparatus and system is configured to allow use of different widths and lengths of tote containers to be placed in the apparatus and is configured so a person may easily remove one particular container from a plurality of containers that are stored in the apparatus. The new apparatus and system can be placed close to walls and other structures in the area without interfering with use of the structure and system. The apparatus comprises an upper mounting section and a lower container engaging section. The mounting section is structured and arranged to be easily mounted to the ceiling, roof or joists of a storage area, including garages, sheds, rooms, closets and like areas and to support the lower container engaging section and the storage containers, and the items stored therein, that are engaged by the lower section above the floor of the area where the totes are stored. The container engaging section is structured and arranged to adjustably support different widths and lengths of totes. As such, it will not be necessary for the user of the apparatus and system to purchase storage totes of the same size, particularly if that would require replacing the user's existing storage containers. The lower container engaging section is also structured and arranged to allow the user to easily remove one of the storage totes from a plurality of storage totes, even if the desired storage tote is in the center or at a closed end (i.e., near a wall or door) of the apparatus. In the preferred configurations, the new container storage apparatus and system are relatively easy to install, easy to use and inexpensive to manufacture.

In one embodiment of the apparatus of the present invention, the new container storage apparatus comprises a container engaging section and a mounting section that cooperate together to removably support a container below one or more area supports, such as a joist or ceiling. The container engaging section is structured and arranged to engage a first lip and a second lip of a container body of the storage container so as to position the storage container in a container space of the container engaging section, with the first lip and the second lip being on opposing walls of the container body. The container engaging section has a static container support member and a dynamic container storage assembly in spaced apart relation to the static container support member so as to define the container space therebetween. The static container support member has a lip engaging member that is sized and configured to engagedly support the first lip of the container body. The dynamic container storage assembly has a lower frame which supports one or more dynamic supports. Each of the dynamic supports has a lip engaging device, an insert member, a tubular receiver member and a biasing mechanism. The insert member is slidably received in an interior of the tubular receiver. The lip engaging device is attached to or integral with a first end of the insert member so as to dispose the lip engaging device in the container space, with the lip engaging device being sized and configured to engagedly support the second lip of the container body. The biasing mechanism is associated with the insert member to bias the lip engaging device toward the lip engaging member of the static container storage member in order to securely hold the storage container between the lip engaging member of the static container storage member and the lip engaging device of one of the dynamic supports so as to removably support the storage container in the apparatus. The biasing mechanism can be a spring that is disposed around the insert member between the first end of the insert member and the inwardly facing end of the tubular receiver member.

The mounting section has an upper frame that is structured and arranged to attach the apparatus to at least one of the one or more area supports. The upper frame is attached to or integral with the lower frame of the container engaging section so as to position the dynamic container support assembly in spaced apart relation to the static container support member and dispose the storage container below the area supports when the storage container is in the storage space. In a preferred embodiment, the upper frame is attached to the static container support member so as to fixedly support the lip engaging member of the static container support member in spaced apart relation to the lip engaging device of the dynamic container support assembly. The upper frame can comprise a first lateral frame member at a front side of the apparatus, a second lateral frame at a back side of the apparatus member and one or more transverse frame members interconnecting the first lateral frame member and the second lateral frame member so as to dispose the first lateral frame member in spaced apart relation to the second lateral frame member. Typically, two or more transverse frame members will be utilized. The static container support member is attached to or integral with at least one of the first lateral frame member and the transverse frame members. The lower frame is attached to or integral with at least one of the second lateral frame member and the transverse frame members. In a preferred configuration, the apparatus also has one or more front support posts and one or more back support posts, with the front support posts interconnecting the upper frame and the static container support member and the back support posts interconnecting the upper frame and the lower frame. The upper frame has a plurality of frame members, with at least one of the frame members having an upper surface that is configured to be attached to the area supports. The upper surface can have one or more slot apertures.

In the preferred embodiment of the apparatus of the present invention, the dynamic supports of the container storage apparatus are configured to move along the transverse frame members generally inside the area defined by the upper frame to provide a more compact apparatus. As with the embodiment set forth above, the apparatus comprises a container engaging section and a mounting section that cooperate together to removably support a container below one or more area supports, such as a joist or ceiling. The container engaging section is structured and arranged to engage a first lip and a second lip of a container body of the storage container so as to position the storage container in a container space of the container engaging section. The container engaging section has a static container support member and a dynamic container storage assembly in spaced apart relation to the static container support member so as to define the container space therebetween. The static container support member has a lip engaging member that is sized and configured to engagedly support the first lip of the container body. The dynamic container storage assembly has one or more dynamic supports, with each of the dynamic supports having a lip engaging device and a biasing mechanism. Each dynamic support is configured to dispose the lip engaging device in the container space. The lip engaging device is sized and configured to engagedly support the second lip of the container body. The biasing mechanism is configured to bias the lip engaging device toward the lip engaging member of the static container storage member to securely hold the storage container between the lip engaging member of the static container storage member and the lip engaging device of the dynamic supports to removably support the storage container in the apparatus.

The mounting section has an upper frame that is structured and arranged to attach the apparatus to at least one of the one or more area supports and to support the container engaging section below the area supports. The upper frame comprises a first lateral frame member at a front side of the apparatus, a second lateral frame member at a back side of the apparatus and one or more transverse frame members disposed between the first lateral frame member and the second lateral frame member. The second lateral frame member is disposed in spaced apart relation to the first lateral frame member. Each dynamic support moveably engages one of the transverse frame members so as to receive, hold and allow removal of the storage container in or from the container space. In one configuration, each dynamic support has a support plate, a moving mechanism associated with the support plate and a lip support assembly interconnecting the support plate and the lip engaging device. The moving assembly moveably mounts the support plate with a transverse frame member so as to move the lip engaging device toward or away from the lip engaging member. In a preferred configuration, the apparatus also has a locking system that is structured and arranged to engage the dynamic container support assembly and prevent movement of the dynamic supports along the transverse member so as to prevent removal of the storage container from the container space of the apparatus. In one configuration, the locking system has a locking frame that is associated with the upper frame, a shaft connected to the locking frame and a handle connected to the shaft. The locking system is configured to engage one or more of the dynamic supports to prevent movement of the dynamic support along the transverse member. In the preferred configuration of the apparatus, the dynamic container support assembly comprises a plurality of the dynamic supports so the new apparatus can be utilized to secure a plurality of containers.

In one embodiment of the system of the present invention, the new container storage system comprises the above-described apparatuses, the area supports and a plurality of containers. In use, the apparatus is secured to the area supports and the containers are removably held by the apparatus.

Accordingly, the primary object of the present invention is to provide a new container storage apparatus and system that has the advantages discussed above and elsewhere in the present disclosure and, when utilized to store a plurality of storage containers, which overcomes the various disadvantages and limitations associated with presently available apparatuses and systems for storing containers.

It is an important objective of the present invention to provide a new storage container apparatus and system that is structured and arranged to support a plurality of storage totes or like containers which allows different sized containers to be placed in the same apparatus and allows a person to more easily remove one particular container from a plurality of containers from the apparatus.

An important aspect of the present invention is that it provides a new container storage apparatus and system that achieves the goals of the above-described objectives.

Another important aspect of the present invention is that it provides a new container storage apparatus and system that is structured and arranged to support a plurality of storage totes or like containers having outward extending lips on opposite sidewalls of the container by the engaging the opposite side lips of each container to support the containers above a floor.

Another important aspect of the present invention is that it provides a new container storage apparatus that is structured and arranged to allow use of storage containers that may have different widths and/or lengths and to allow a person to easily remove one particular storage container from a plurality of storage containers that are stored in the apparatus.

Another important aspect of the present invention is that it provides a new container storage apparatus that has an upper mounting section and a lower container engaging section, with the upper mounting section being structured and arranged to be mounted to the ceiling, roof or joists of a storage area and to safely support the lower container engaging section and storage containers above the floor and the lower container engaging section being structured and arranged to adjustably support different widths and lengths of storage containers in a manner which allows an individual container to be easily removed.

Yet another important aspect of the present invention is that it provides a new container storage apparatus and system that is relatively easy to install, easy to use and inexpensive to manufacture.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 1 is a side view of a prior art storage tote container which may be utilized with the apparatus and system of the present invention;

FIG. 2 is an end view of the storage tote container of FIG. 1 with the lid removed to better show the lips on the opposing sidewalls of the container;

FIG. 3 is a right side view of a container storage system configured according to a first embodiment of the present invention shown in use storing a storage tote container configured as shown in FIG. 2;

FIG. 4 is a right side view of the container storage system of FIG. 3 shown in use with a wider storage container;

FIG. 5 is a side view of the apparatus of FIGS. 3 and 4;

FIG. 6 is a top front perspective view of the apparatus of FIG. 5 better showing the plurality of dynamic support members and the slots in the upper surface of the static support members;

FIG. 16 is a right side perspective view of the container storage system of FIG. 15;

FIG. 17 is a left side perspective view of the container storage system of FIG. 15;

FIG. 18 is an isolated right side view of one of the dynamic support members shown movably mounted to a transverse frame member;

FIG. 19 is an isolated left side view of the dynamic support member of FIG. 18;

FIG. 21 is a top back perspective view of the locking assembly of FIG. 20; and

FIG. 22 is a top view of the locking assembly of FIG. 21.

DETAILED DESCRIPTION OF THE PREFERRED EMBODIMENTS

Figure 7:
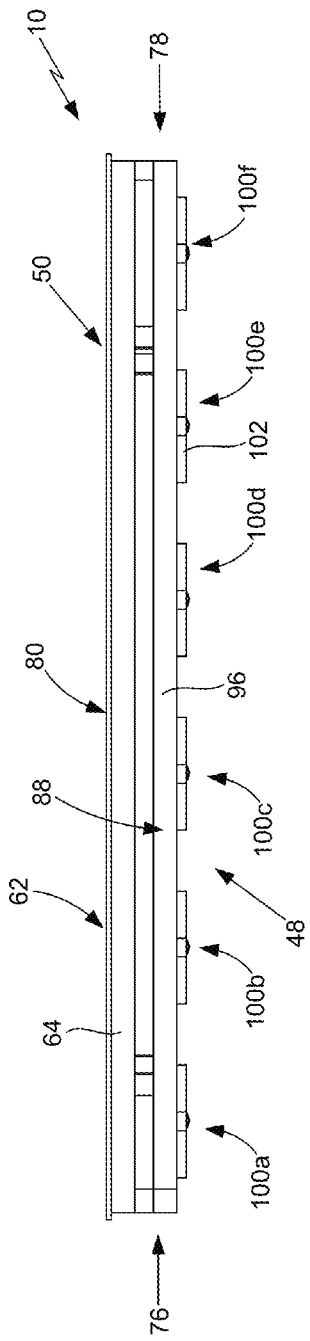
FIG. 7 is a front view of the apparatus of FIG. 4.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the apparatus and system of the present invention and the storage containers utilized therewith, those persons who are skilled in the art will readily appreciate that the present invention is not so limited. In addition, the exemplary embodiments of the present device are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of mounting systems and container engaging systems.

A container storage apparatus that is configured pursuant to one of the preferred embodiments of the present invention is shown generally as 10 in FIGS. 5-10. A container storage system including the apparatus 10 is shown as 12 in FIGS. 3 and 4. A prior art storage container which may be utilized with the new apparatus 10 and system 12 of the present invention is shown as 14 in FIGS. 1 and 2. A typical storage container 14, commonly referred to as a storage tote, for use with the apparatus 10 and system 12 has a square or rectangular shaped container body 15 with a first side 16, an opposing second side 18, a first end 20 an opposing second end 22, a lower end 24 and an upper end 26, as shown in FIGS. 1 and 2. The storage container 14 has a plurality of walls, including a first sidewall 28 at the first side 16, an opposing second sidewall 30 at the second side, a first end wall 32 at the first end 20, an opposing second end wall 34 at the second end 22, a bottom wall 36 at the lower end 24 and a lid 38 a the upper end 26 that define an interior chamber 40, shown in FIG. 2 with the lid 38 removed. As well known in the art, the lid 38 may be hingedly attached to one or more of the sidewalls 28/30 or end walls 32/34 or the lid 38 may be removably attached to the upper end 26 of the container 14, often by using the handle/latch combinations 42 at the end walls 32/34, as shown in FIGS. 1 and 2. As shown in the figures, and understood by persons in the relevant art, the width W of container body 15 is from the first side 16 to the second side 18, the length L of container body 15 is from the first end 20 to the second end 22 and the depth D of container body 15 is from the lower end 24 to the upper end 26 thereof.

For purposes of using the container 14 with the apparatus 10 and system 12 of the present invention, the container body 15 must have at least two outwardly extending lips on opposing walls of the container body 15, such as at opposing sides 16/18 or ends 20/22 (walls 28/30 or 32/34) that, as set forth below, are engaged by components of the apparatus 10. With regard to the prior art container 14 shown in FIGS. 1 and 2, the first sidewall 28 has a first lip 44 and the opposing second sidewall 30 has a second lip 46, both of which extend outwardly (i.e., in the direction away from the sidewall and the interior chamber 40) from their respective sidewalls 28/30 at or near the upper end 26, as shown in FIG. 2.

As set forth in more detail below, the lips 44/46 of the container 14 are engaged by the lower container engaging section 48 of the apparatus 10, which is preferably sized and configured to support a plurality of the containers 14, and the container engaging section 48 is supported by an upper mounting section 50 of the apparatus 10 that mounts the apparatus 10 to one or more area supports 52 in the area, such as the garage, shed, room, closet or the like, where the user of the apparatus 10 and system 12 of the present invention desire to store the storage containers 14. In FIGS. 3 and 4, the area supports 52 are shown as a joist or other roof member 54, shown above a ceiling 56. As will be readily appreciated by persons skilled in the art, the area supports 52 may be a joist 54 (as shown), the ceiling 56 (if strong enough on its own), the roof over the area or a variety of other area supports 52 to which the mounting section 50 of the apparatus 10 can be mounted. Typically, but not exclusively, the mounting section 50 will be mounted to the area supports 52 using an appropriate connecting mechanism 58, such as one or more nails, screws, bolts or other connectors 60 (shown in FIGS. 3 and 4) or by welding or other appropriate mechanisms 58 depending on the materials utilized for the mounting section 50 of apparatus 10 and area supports 52. As shown in FIGS. 3 and 4, the system 12 of the present invention comprises the apparatus 10, one or more (typically a plurality of) containers 14 and area supports 52, whether joists 54, ceiling 56, roof or any other structurally adequate members.

The mounting section 50 of the apparatus 10 generally comprises an upper frame 62 having a plurality of frame members, including a first lateral frame member 64, second lateral frame member 66, first transverse frame member 68 and second transverse frame member 70, as best shown in FIGS. 6, 8, 9, 10 and 13. The lateral frame members 64/66 extend across the front side 72 and back side 74 of the apparatus 10, in spaced apart relation to each other, and the two transverse frame members 68/70 extend across the first side 76 and second side 78 of the apparatus 10 to interconnect the two lateral frame members 64/66, as best shown FIGS. 6, 8, 9 and 13, to support the container engaging mechanism 48 below the upper frame 62 of the mounting section 50, as best shown in FIGS. 2-4 and 5. As will be readily appreciated by persons skilled in the art, the upper frame 62 can have more than the two lateral frame members 64/66 and it can comprise only one of the transverse frame members 68/70 (i.e., at or near the center of the two lateral frame members 64/66) or more than two transverse frame members 68/70 as may be needed or necessary, or deemed desirable, to safely support the apparatus 10, containers 14 and the items in the containers 14 below the area supports 52 in the garage, shed, room, closet or other area where apparatus 10 and system 12 are being utilized. The various components of the upper frame 62 can be made out of metal, plastic, fiberglass, composites and other materials, the selection of which will generally affect the weight of the containers (and their items) that can be supported by the apparatus 10.

To mount the mounting section 50 to the area supports 52, at least one of the frame members 64/66/68/70 of the upper frame 62 is provided with an upper surface 80, best shown in FIGS. 6, 8, 9 and 13, that is positioned in engagement with, directly or indirectly, with the area supports 52, as shown in FIGS. 3 and 4. A connecting mechanism 58 is utilized to secure the frame members 64/66/68/70 with the upper surfaces 80 to the area supports 52. As will be readily appreciated by persons skilled in the art, most installations of apparatus 10 will secure the mounting section 50 of the apparatus 10 to wooden joists 54. As such, the upper surfaces 80 that are to be utilized for mounting apparatus 10 to the area supports 52 will include one or more mounting apertures 82 in the upper surface 80 so one or more connectors 60, such as a bolt or screw, can be inserted into or through the joists 54. In the embodiment shown in the figures, the apertures 82 are configured as slots that extend at least partially the length of the upper surfaces 80. The use of slots as apertures 82 will provide the user with increased flexibility with regard to the positioning of the frame members 64/66/68/70 relative to the area supports 52 (i.e., joists 54), as opposed to having a plurality of individual apertures 82 in the upper surface 80 or requiring the person installing apparatus 10 to drill a hole through the frame members 64/66/68/70. In the embodiment shown in the figures, the two lateral frame members 64/66 each have an upper surface 80 with a slot aperture 82 therethrough for attaching the apparatus 10 to the area supports 52. If desired, the transverse frame members 68/70 can also have the upper surfaces 80 and apertures 82 or can have them instead of lateral frame members 64/66. In the embodiment shown in the figures, the lateral frame members 64/66 are L-shaped frame members with one side of the "L" providing the upper surface 80 and the other side of the "L" being attached to the transverse frame members 66/68 by welding or other mechanisms appropriate for the materials utilized for the upper frame 62.

Figure 8:
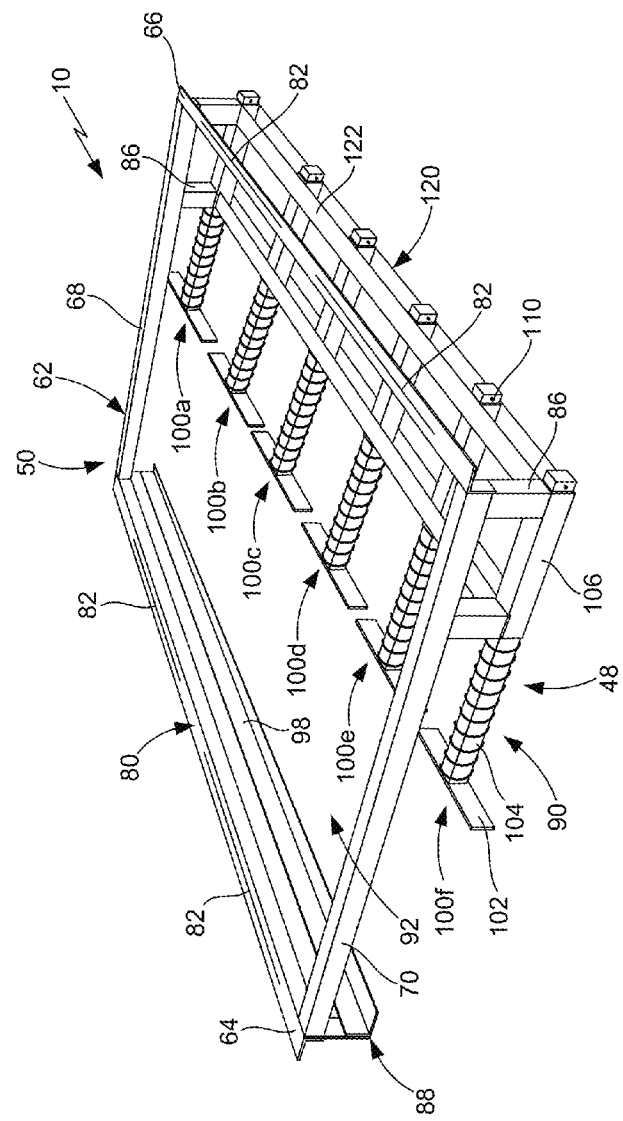
FIG. 8 is a bottom side perspective of the apparatus of FIG. 4.
Figure 9:
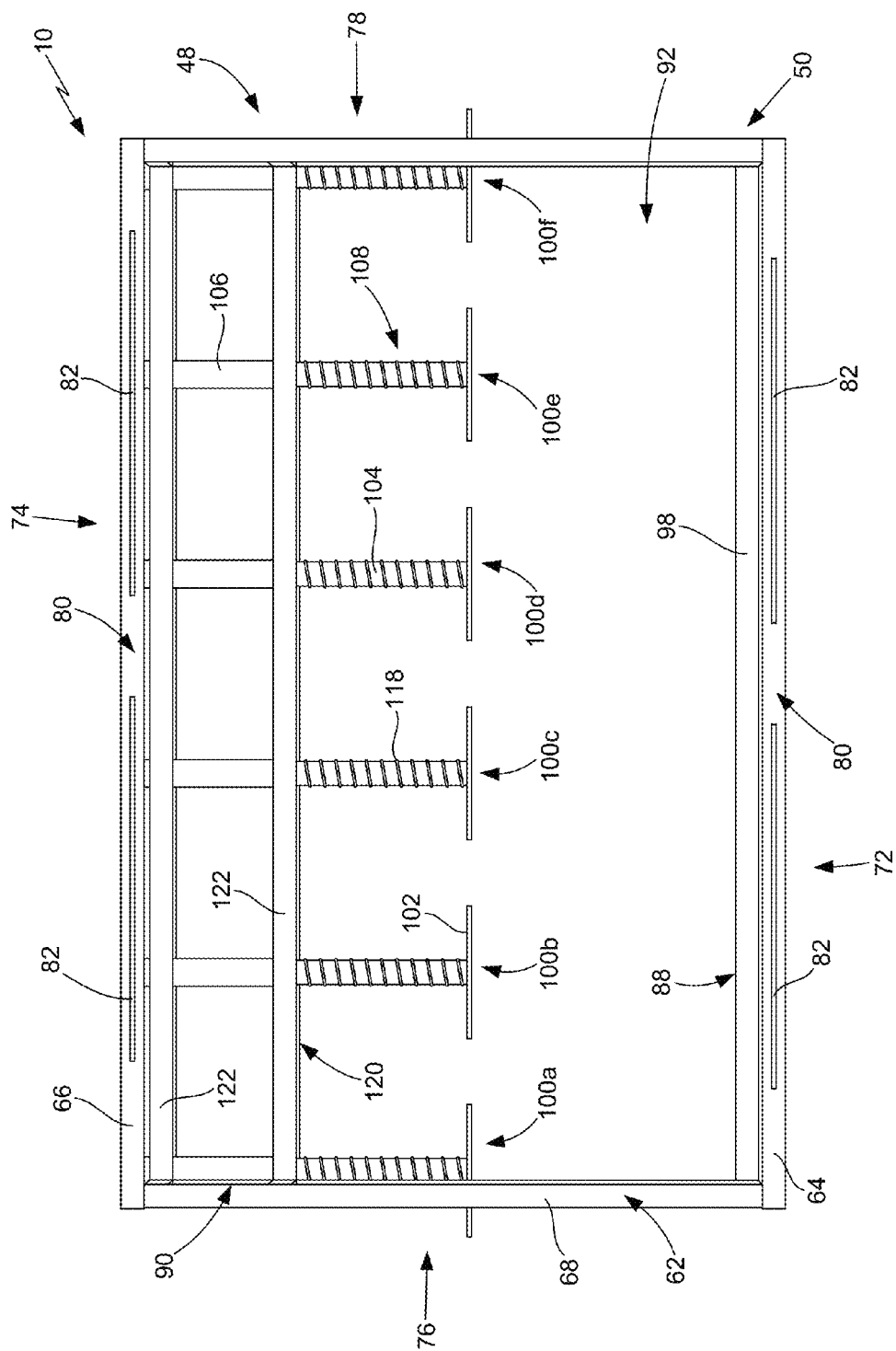
FIG. 9 is a top view of the apparatus of FIG. 4.
Figure 10:
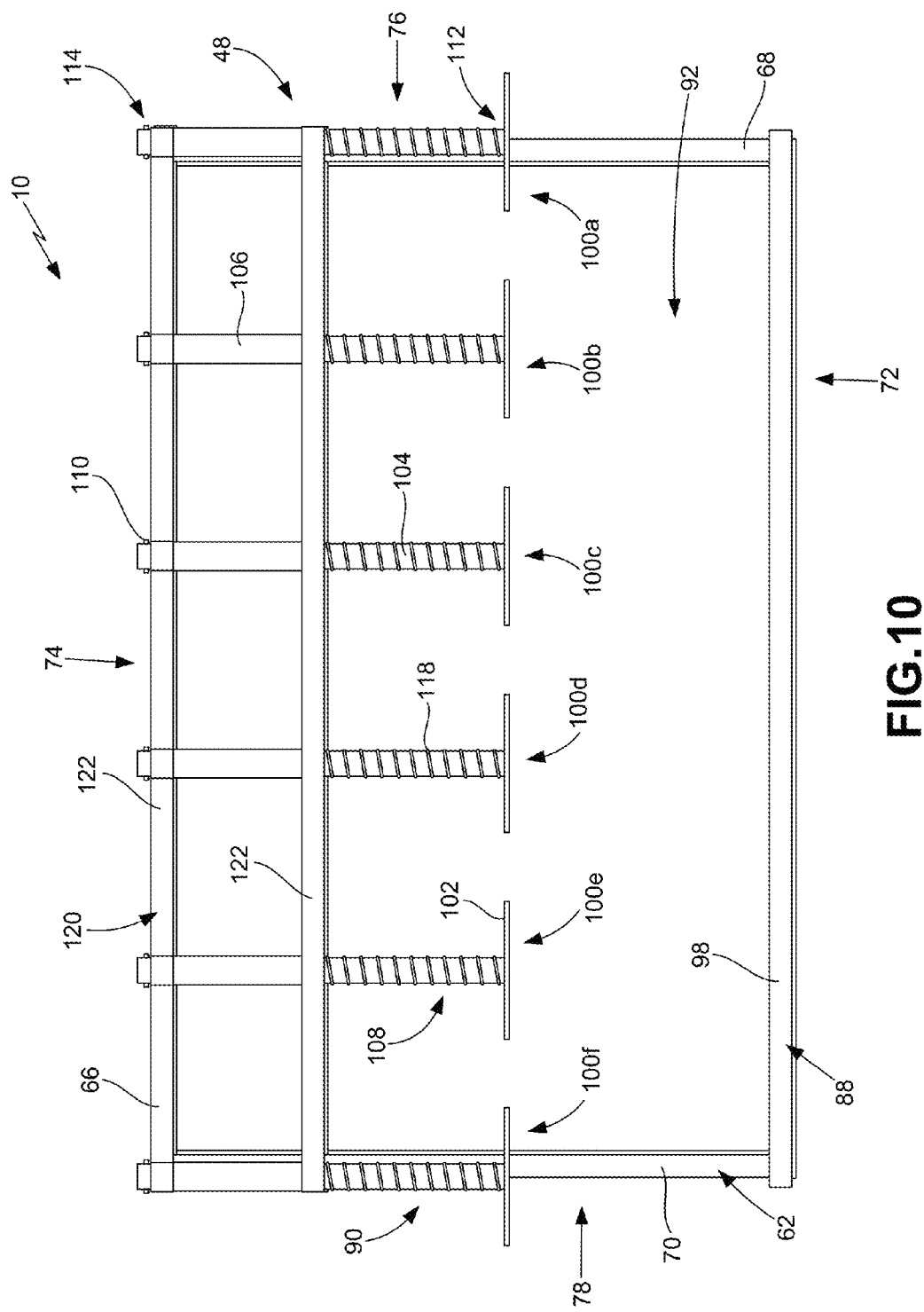
FIG. 10 is a bottom view of the apparatus of FIG. 4.
Figure 13:
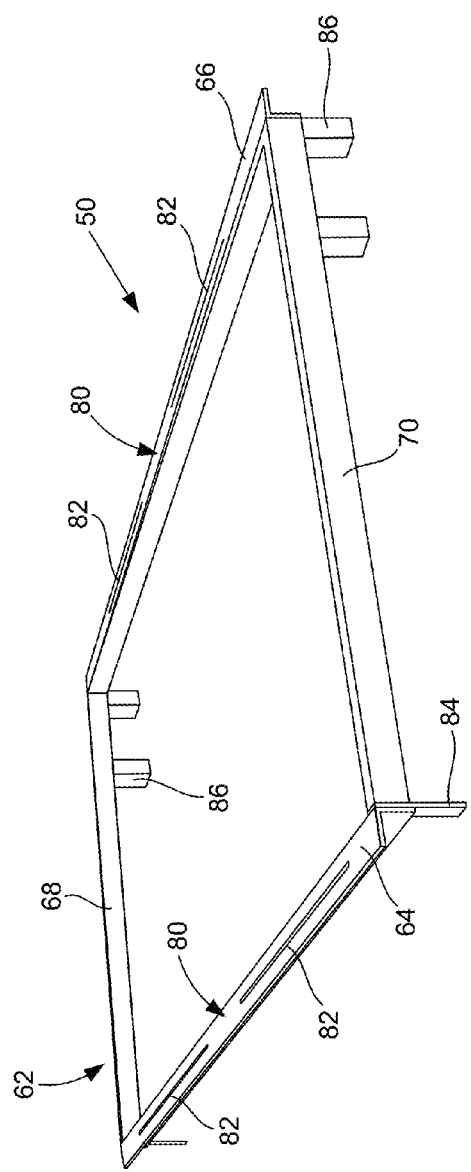
FIG. 13 is a right side perspective view of the upper mounting section of the apparatus of FIG. 4.

Interconnecting the upper mounting section 50 and the lower container engaging section 48 are a plurality of support posts, shown as front support posts 84 and back support posts 86, as best shown in FIGS. 3-6, 8 and 13. In the embodiment shown in the figures each side 76/78 of the apparatus 10 has a single front support post 84 and a pair of back support posts 86, as shown in FIGS. 6, 8 and 13. If desired or deemed necessary more support posts 84/86 than those shown can be utilized to connect the container engaging section 48 to the upper frame 62 of the mounting section 50. The support posts 84/86 can be separate components that are removably or fixedly attached to (so as to interconnect) both the container engaging section 48 and the mounting section 50. Alternatively, both of the support posts 84/86 can be made integral with one of the container engaging section 48 and the mounting section 50. In another alternative configuration, one of the front support posts 84 and back support posts 86 can be integral with one of the container engaging section 48 or the mounting section 50 and the other of the support posts 84/86 can be integral with the other section 48/50. In yet another embodiment, various other combinations can be put together with regard to one or more of the support posts 84/86 being integral with one or the other of the container engaging section 48 or the mounting section 50. The support posts 84/86 must be made out of materials that are sufficiently strong to support the weight of the container engaging section 48 and the containers 14, with items stored therein, that are to be supported by the apparatus 10.

The container engaging section 48 of the apparatus 10 generally comprises a static container support member 88 and a dynamic container support assembly 90 that define a container space 92, as best shown in FIGS. 3-6 and 8-11, therebetween and which cooperate together to engage and hold one or more containers 14 in the container space 92 so as to store the containers 14 in the apparatus 10, as shown in FIGS. 3 and 4. As set forth in more detail below, the static container support member 88 is stationary and provides a surface that will engage one of the lips 44/46 of a container 14 and the dynamic container support assembly 90 moves inward and outward, depending on the width W or length L of the container 14, to engage the other of the lips 44/46 of the container 14 to securely, but easily removably, hold the container 14 in the apparatus 10.

In the embodiment shown in the figures, the static container support member 88 is an L-shaped member 94 having a vertical member 96 that attaches to or is integral with the front support posts 84 and a lip engaging member 98 that is sized and configured to engage one of the lips 44/46 of the container 14, as shown in FIGS. 1 and 2. In one embodiment, the lip engaging member 98 is substantially horizontal that extends inwardly into the container space 92 and a lip, such as first lip 44 as shown in FIGS. 3 and 4, will sit on top of the horizontal lip engaging member 98 (with the container 14 being pressed against the lip engaging member 98 by the dynamic container support assembly 90). As will be readily appreciated by persons skilled in the relevant art, the lip engaging member 98 can be of a wide variety of different sizes and configurations, including an L-shaped member that has a portion of which extends upward, a curved or hook-like end, an upwardly angled member and the like that engages a lip 44/46 of the container 14 to hold one side 16/18 or one end 20/22 of the container 14. As with most of the other components of the apparatus 10, the static container support member 88 can be made out of a wide variety of materials, with the components thereof attached or integral to each other and attached to or integral with the front support posts 84 and/or the upper frame 62 of the mounting section 50.

Figure 11:
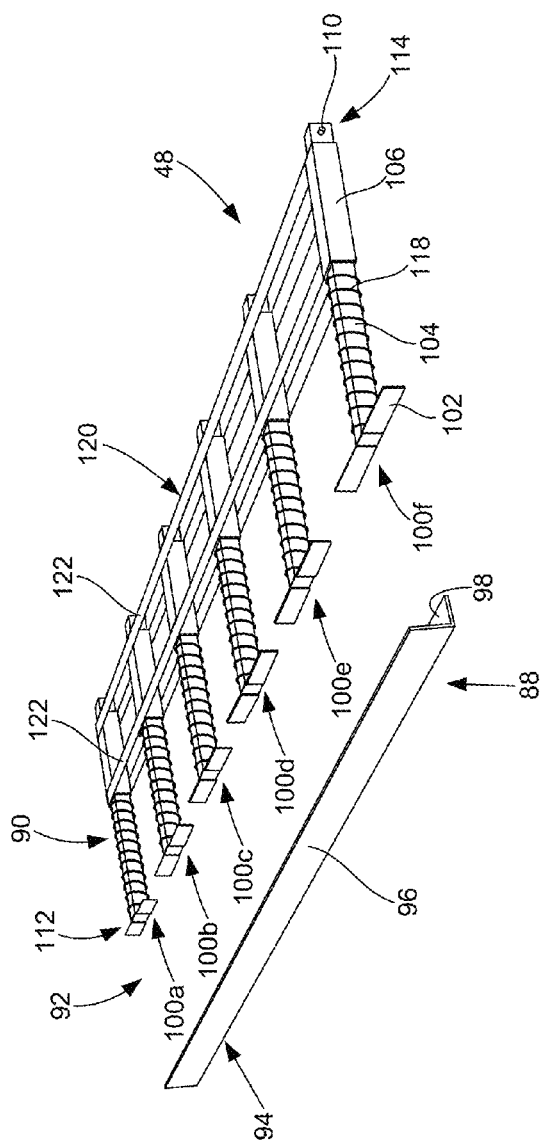
FIG. 11 is a partially exploded side perspective view of the lower container engaging section of the apparatus of FIG. 4.
Figure 12:
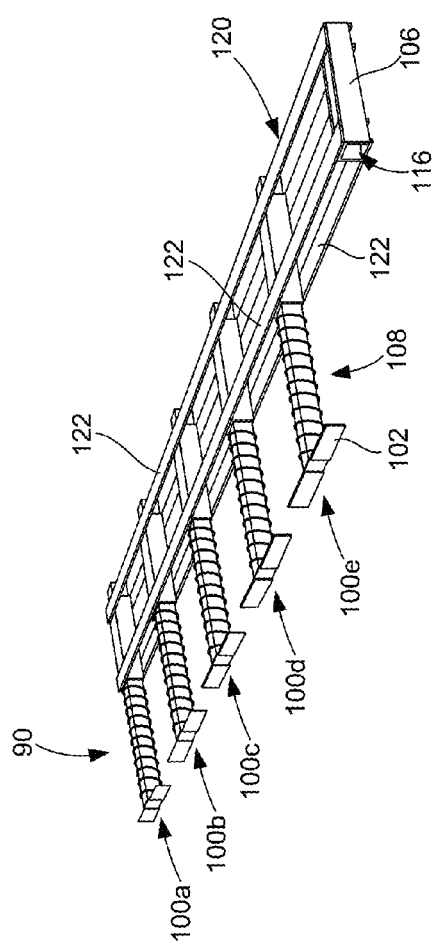
FIG. 12 is a right side perspective view of the dynamic support members of the lower container engaging section of FIG. 11 with one of the insert members removed to better show the tubular member in which the insert member is slidably received.

As set forth above, the dynamic container support assembly 90 is structured and arranged to move inward and outward relative to the container space 92 to either engage and hold the container 14, by one of the lips 44/46 thereof, in the container space 92 or for removal of the container 14 from the apparatus 10 and/or placement of a wider or longer container 14 in the container space 92. To accomplish the objectives of engaging a lip 44/46 of the container 14 and moving inward and outward relative to the container space 92, the dynamic container support assembly 90 has a plurality of dynamic supports 100, with six shown in the figures as first dynamic support 100a, second dynamic support 100b, third dynamic support 100c, fourth dynamic support 100d, fifth dynamic support 100e and sixth dynamic support 100f (collectively, they are referred to as dynamic supports 100), to removably engage and secure a container 14 in apparatus 10. Each of the dynamic supports 100 are structured and arranged to separately and individually move inward and outward relative to the container space 92 so that each dynamic support 100 can secure a container 14. The dynamic supports 100 generally comprise a lip engaging device 102 that is sized and configured to engage a lip 44/46 of the container 14, an insert member 104 attached to the lip engaging device 102 to move the lip engaging device 102 inward and outward, a tubular receiver member 106 that slidably receives and guides the insert member 104 as insert member 104 moves inward and outward relative to container space 92, a biasing mechanism 108 that bias the slidable insert member 104 and lip engaging device 102 into the container space 92 and a biasing stop member 110 that prevents the end of the insert member 104 from being biased into or beyond the tubular receiver member 106, as best shown in FIGS. 11 and 12. As with the other components of the apparatus 10, the dynamic supports 100 can be made out of metal, plastic, fiberglass, composites or other materials that will be appropriate for the weight of the containers 14 and the items stored therein.

In the embodiment shown in the figures, particularly FIGS. 6 and 8-12, the lip engaging device 102 are rectangular shaped plates that are sized and configured to be received under one of the lips 44/46 of the containers 14, such as the second lip 46 as shown in FIGS. 3 and 4. As will be readily appreciated by those persons who are skilled in the art, however, the lip engaging device 102 can be a variety of different types of devices (i.e., not plates) that are sized and configured to press against one of the sidewalls 28/30 or end walls 32/34 and engage the underside of the lip 44/46. For instance, the lip engaging devices 102 can be L-shaped or other shaped members, hook or hook-like devices or a wide variety of other members that can press against the container 14 with damaging the wall 28/30/32/34 having the lip 44/46 and supportedly engage the lip 44/46 to securely hold the container 14 in the container space 92.

As best shown in FIGS. 3-5, the lip engaging devices 102 are attached to or integral with the first end 112 of the insert member 104 and the biasing stop member 110 is at or near the second end 114 of the insert member 104. The biasing mechanism 108 is configured to push the first end 112 of the insert member 104 into the container space 92 when there is no container 14 being supported with the associated dynamic support 100 and against the container 14 when the container 14 is in the container space 92. The biasing stop member 110 at or near the second end 114 of insert member 104 prevents the insert member 104 from being pushed all the way into or through the tubular receiver member 106 when there is no container 14 in the container space 92. In one embodiment, the biasing stop member 110 is a pin/cotter key arrangement, with the pin being received through an aperture at or near the second end of the insert member 104, that stops the second end 114 of the insert member 104 from entering into the tubular receiver member 106 at the back side 74 of the apparatus 10. In another embodiment, the biasing stop member 110 is a plate, bar, rod or other device that prevents the second end 114 of the insert member 104 from entering into the tubular receiver member 106.

The insert member 104 and the tubular receiver member 106 must be cooperatively sized and configured so the insert member 104 will be slidably disposed in the tubular receiver member 106. Although a wide variety of different shapes and sizes can be utilized for the insert member 104 and the tubular receiver member 106, it is preferred that the shapes and sizes be selected to prevent the insert member 104 from rotating relative to the tubular receiver member 106. In the embodiment shown in the figures, both of the insert member 104 and the tubular receiver member 106 are square, with the tubular receiver member 106 defining a square-shaped interior (shown as 116 in FIG. 12) that is sized to be slightly larger than the insert member 104. In FIG. 12, the lip engaging device 102, insert member 104 and biasing mechanism 108 of the dynamic support 100f is not shown to better illustrate the interior 116 of the tubular receiver members 106 in which the insert member 104 is slidably disposed. As will be readily appreciated by persons skilled in the art, the insert member 104 and tubular receiver member 106 can have a variety of other cooperatively configured shapes, preferably non-rotating shapes, such as oval, triangular, trapezoidal and the like.

As set forth above, the biasing mechanism 108 is structured and arranged to bias the first end 112 of the insert member 104 and the lip engaging device 102 attached thereto or integral therewith into the container space 92 when there is no container 14 and against a wall 28/30/32/34 of the container 14 when a container 14 is in the container space 92 to be supported by apparatus 10. In a preferred embodiment, the biasing mechanism 108 comprises a spring 118 that is disposed around the insert member 104 and between the lip engaging device 102 and the inwardly disposed end of the tubular receiver member 106, as best shown in FIGS. 3-6 and 8-12. The spring 118, or other biasing mechanism 108, should be selected so as to have sufficient biasing force to press the lip engaging device 102 tightly against the wall 28/30/32/34 of the storage container 14 and maintain the pressure at the lip 44/46 of the container 14 with sufficient force to hold the storage container 14 in place in the container space 92 without crushing or otherwise damaging the container 14. In addition, the spring 118 or other biasing mechanism 108 should not have a biasing force that is so strong that it is difficult for the typical person who will be placing or removing the container 14 into or from the container space 92 to move the lip engaging device 102 toward the tubular receiver member 106 to expand the container space 92.

To support the dynamic container support assembly 90 in position relative to the mounting section 50, the apparatus 10 has a lower frame 120 with a plurality of lower frame members 122, as best shown in FIGS. 6 and 8-12. The lower frame members 122 are structured and arranged to support the components of the dynamic container support assembly 90 and to fixedly or removably secure the container engaging section 48 to the back support posts 86, which may be utilized to interconnect the container engaging section 48 and the upper frame 62 of the mounting section 50 so the entire apparatus 10 may be mounted to one or more area supports 52. As set forth above, one or more of the back support posts 86 may be attached to or integral with the lower frame 120. In addition, in an alternative configuration, the lower frame 120 may directly attach to or be integral with the upper frame 62.

Figure 14:
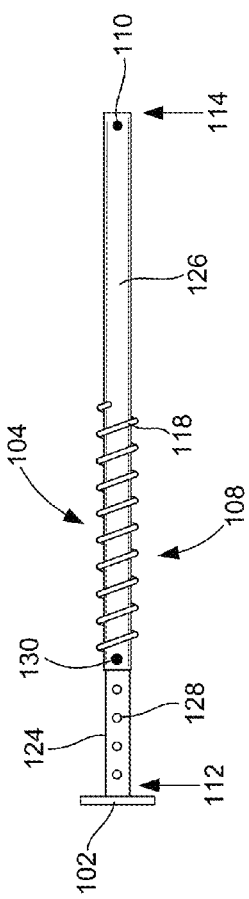
FIG. 14 is a side view of an alternative embodiment of the insert member that may be utilized with the apparatus of FIG. 4

A variety of alternative configurations may be utilized for the various components of the apparatus 10 and system 12 of the present invention. For instance, as shown in FIG. 14, the insert member 104 may be configured to be adjustable in length to provide more or less width in the container space 92. In one such configuration, the insert member 104 comprises a first insert member 124 that is telescopically and slidably received in a second insert member 126, with each of the first insert member 124 and second insert member 126 having apertures 128 that may be placed in alignment so that a pin 130 or other device may be inserted through the aligned apertures 128 to fix the length of the insert member 104, as shown in FIG. 14. In another alternative embodiment, the lip engaging devices 102 may be wide enough so the edge of a lip engaging device 102 of a dynamic support 100 will be touching or nearly touching the edge of the lip engaging device 102 of the adjacent dynamic support 100 to provide a continuous or nearly continuous surface along the top of the lip engaging devices 102 so a container 14 may be slid along the plurality of lip engaging devices 102 into the desired position. In this embodiment, each of the lip engaging devices 102 may have a hinge or other device at or near the center thereof to allow the lip engaging device 102 to be flexible. In another configuration of this embodiment, adjacent lip engaging devices 102 may be connected end to end using a slick connecting member that is made out of plastic or other material that will provide a smooth and easy to slide on surface for the containers 14.

A second embodiment, which is likely to be a preferred embodiment, of the container storage apparatus 10 is shown in FIGS. 15-22. As set forth in more detail below, this embodiment of the apparatus 10 is structured and arranged to be mounted to an area support 52, such as joist 54, ceiling 56 or the like, and to removably support one or more storage containers 14 but in a substantially more compact sized configuration than the embodiment described above and shown in FIGS. 3-14. The apparatus 10, as well as a system 12 using the apparatus 10 of the second embodiment, also comprises a container engaging section 48 that is structured and arranged to removably support the storage containers 14 and a mounting section 50 that mounts the apparatus 10 to an area support 52.

Figure 15:
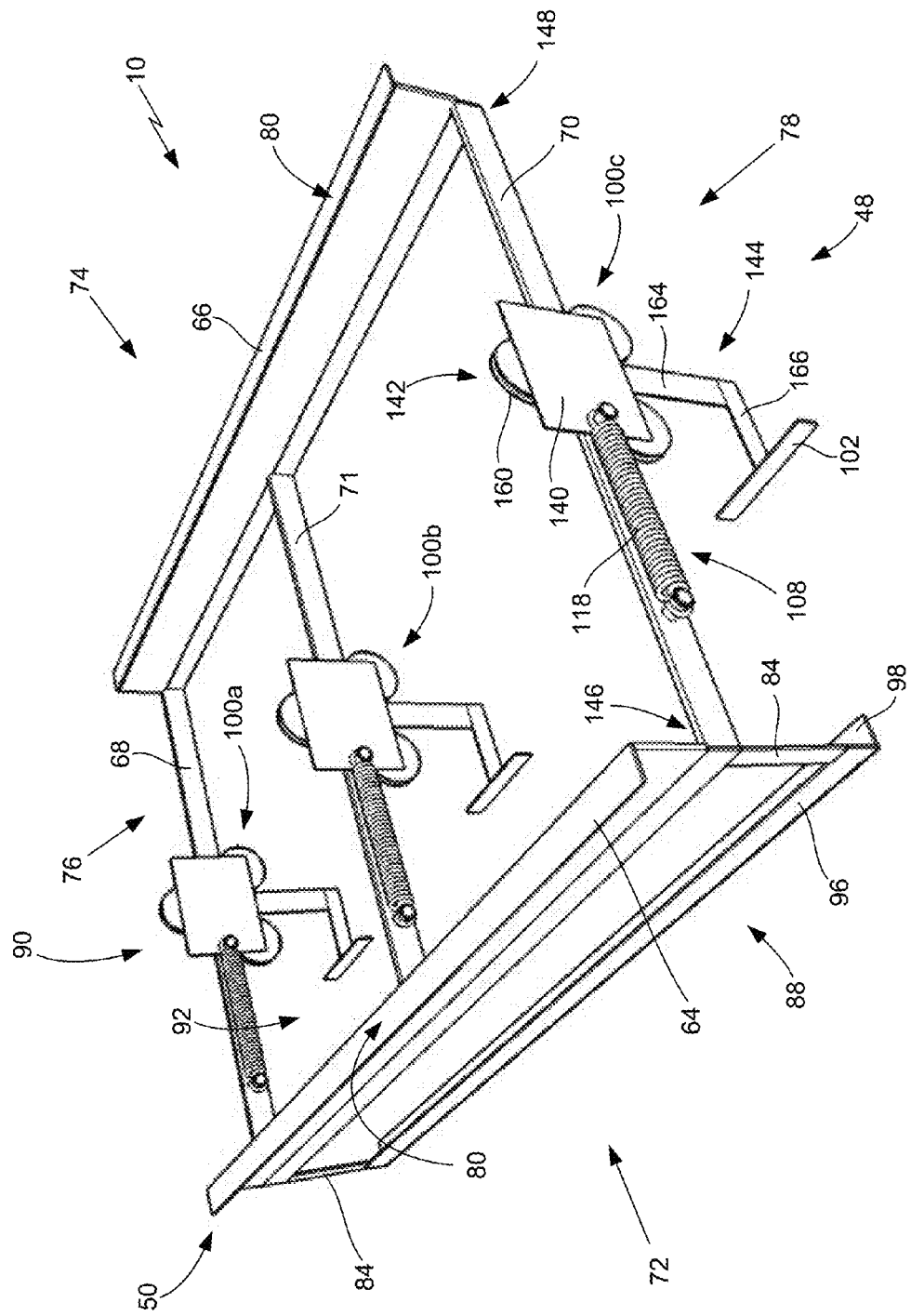
FIG. 15 is a top front perspective view of a container storage system configured according to a second embodiment of the present invention.
Figure 20:
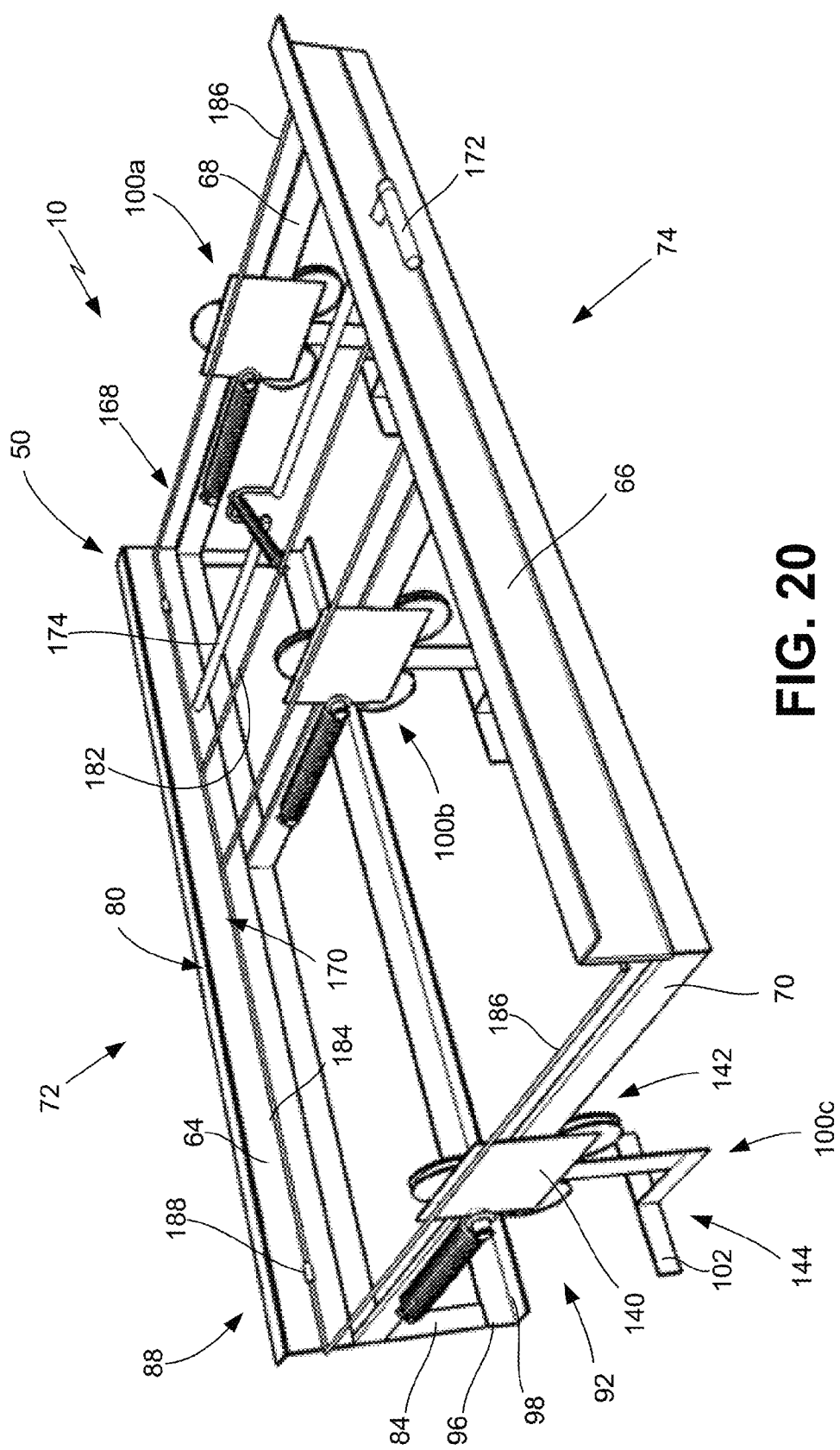
FIG. 20 is a top back perspective view of the container storage system of FIG. 15 shown with a locking assembly added thereto to fix the position of the dynamic support members.

As with the above embodiment, the mounting section 50 of this apparatus 10 generally comprises a frame 62 having a plurality of frame members, including a first lateral frame member 64, second lateral frame member 66, first transverse frame member 68 and second transverse frame member 70, as best shown in FIGS. 15-17 and 20. In this embodiment, there is no upper/lower frame (i.e., elements 62 and 120, respectively, of the above embodiment) and there are one or more central transverse frame members 71 that are positioned between the first 68 and second 70 transverse frame members (as best shown in FIGS. 15 and 20). The lateral frame members 64/66 extend across the front side 72 and back side 74 of the apparatus 10, in spaced apart relation to each other, and the two transverse frame members 68/70 extend across the first/left side 76 and second/right side 78 of the apparatus 10 to interconnect the two lateral frame members 64/66 to support the container engaging mechanism 48 (as well as any storage containers 14 that are engaged thereby) below the frame 62 of the mounting section 50, as best shown in FIGS. 15-17 and 20. With regard to describing the present embodiment, the description and drawings referenced above with regard to the embodiment of FIGS. 3-14, including the sizes, materials, components and mounting alternatives, are hereby incorporated herein as though fully set forth with regard to the present embodiment of the apparatus 10.

With regard to the container engaging section 48 of the apparatus 10 of FIGS. 15-22, the container engaging section 48 is structured and arranged to engage the container body 15 to position the storage container 14 in the container space 92, as shown in FIGS. 15-17 and 20, of the container engaging section 48. As described above, the container engaging section 48 of this embodiment also comprises a static container support member 88 and a dynamic container storage assembly 90 that is in spaced apart relation to the static container support member 88 to define the container space 92 therebetween. As previously described, the static container support member 88 has a lip engaging member 98 that is sized and configured to engagedly support the first lip 44 of the container body 15. The dynamic container storage assembly 90 has a plurality of dynamic supports 100 that each moveably support a lip engaging device 102, as shown in FIGS. 15-20, that is sized and configured to engagedly support the opposing second lip 46 of the container body 14. As with the above embodiment, and explained in more detail below, the dynamic supports 100 of the dynamic container storage assembly 90 has a biasing mechanism 108 that bias the lip engaging device 102 toward the lip engaging member 98 of the static container storage member 88 to securely hold the storage container 14 between the lip engaging member 98 of the static container storage member 88 and the lip engaging device 102 of the dynamic container support assembly 90 to removably support the storage container 14 in the container space 92 of the apparatus 10. As explained in more detail below, the dynamic supports 90 do not utilize the insert member 104 or tubular receiver member 106 described above, which reduces the "footprint" of the apparatus 10 and likely reduces manufacturing costs and installation difficulties, and each of the dynamic supports 100 (such as 100a, 100b and 100c) are moveably mounted to a transverse frame member 68/70/71, as best shown in FIGS. 15-20. For purposes of describing the present embodiment, the transverse frame members 68/70/71 to which a dynamic support 100 is moveably mounted are collectively referred to as dynamic support frame members 140

The dynamic supports 100 of the present embodiment comprises a support plate 140, a biasing mechanism 108 interconnecting the support plate 140 and one of the transverse frame members 68/70/71, a moving mechanism 142 that is associated with support plate 140 to allow the dynamic support 100 to move along the transverse frame member 68/70/71 and a lip support assembly 144 that supports and positions the lip engaging device 102, as best shown in FIGS. 18 and 19. The dynamic support 100c is shown in FIGS. 18 and 19 moveably mounted on the second or right lateral frame member 70. In the present embodiment, the other dynamic supports, shown as 100a and 100b in the figures, are configured the same as shown in FIGS. 18 and 19 except mounted to different transverse frame members, namely the first/left lateral frame member 70 or the central lateral frame member 71 (of which there may be multiple such members positioned between the first 68 and second 70 lateral frame members). For purposes of describing the present embodiment, each of the lateral frame members 68/70/71 have a first or front end 146 that is attached to or integral with the first/front lateral frame member 64 and a second or back end 148 which is attached to or integral with the second/back lateral frame member 66.

With regard to the dynamic support 100 shown in FIGS. 18-19, the dynamic support 100c has a biasing mechanism 108, which may be a tension spring 108 or the like, that interconnects the second transverse frame member 70 at a position towards the first end 146 thereof and the support plate 140, as best shown in FIG. 18. In the embodiment shown, the spring 118 connects to a first pin 150 on the second transverse frame member 70 and to a second pin 152 on the support plate 140. The biasing mechanism 108 is positioned and configured to allow the user to push the dynamic support 100c toward the second end 148 of the transverse frame member 70, typically using a portion of the storage container 14 itself, to expand the container space 92 when he or she is placing the storage container 14 therein or removing the storage container 14 therefrom and then bias the dynamic support 100c back toward the first end 146 of the second transverse frame member 70. The biasing mechanism 108 should be configured to press the lip engaging device 102 sufficiently hard enough against the storage container 14, typically at the second sidewall 30 below the second lip 46, to hold the storage container 14 between the lip engaging device 102 of the dynamic support 100c and the lip engaging member 98 of the static container support member 88, as further described herein, to securely hold the support container 14 in the apparatus 10. The biasing mechanism 108 should be able to extend sufficiently easily that the user will be able to push the dynamic support 100 backwards, with moving mechanism 142, toward the second end 148 of the respective transverse frame member 68/70/71 so the user will be able to avail himself or herself of at least substantially the full container space 92 for larger sized storage containers 14.

The moving mechanism 142 is structured and arranged to allow a dynamic support 100 to move forward, namely toward the front lateral frame member 64 and static container support member 88 at the front side 72 of the apparatus 10, or rearward, namely toward the back lateral frame member 66 at the back side 74 of the apparatus 10, as biased by the biasing mechanism 108 or desired by the user (i.e., when placing a storage container 14 in the container space 92). In the embodiment shown in FIGS. 15-22, each moving mechanism 142 is configured to movably engage one of the transverse frame members and move the dynamic supports 100 towards and away from the first end 146 and second end 148 of the transverse frame members 68/70/71. The moving mechanism 142 in the embodiment shown in the figures comprises three "pulley" type wheels, shown as first wheel 154, second wheel 156 and third wheel 158 in FIGS. 18 and 19, that are shaped and configured to moveably engage the transverse frame members 68/70/71, as best shown in FIGS. 15-17 and 20. As shown in these figures, the edges 160 of the wheels 154/156/158 are slotted to engage the transverse frame members 68/70/71 and move along the length thereof. Ball bearings and an axle 162 facilitate easy movement of the wheels 154/156/158 along the transverse frame members 68/70/71. In a preferred configuration, the wheels 154/156/158 will fit snugly around the transverse frame members 68/70/71 associated with the dynamic support 100a/100b/100c so as to ride smoothly along the various transverse frame members 68/70/71.

As will be readily appreciated by persons skilled in the relevant art, the moving mechanism 142 can be configured in a wide variety of different manners and utilize a variety of different components such as wheels, rollers and the like that move along a flat surface. In addition, the moving mechanism 142 can have less or more wheels 154/156/158 than shown in the figures and use a combination of wheels, rollers and/or other devices that can move along a transverse frame member 68/70/71. As such, the moving mechanism 142 shown in the figures is intended to be representative of one type of a mechanism that can be utilized with the present invention.

The lip support assembly 144 comprises a downwardly directed first lip support member 164 and a forwardly directed second lip support member 166, as best shown in FIGS. 18 and 19. The term "downwardly" refers to a direction away from the area supports 52 to which the apparatus 10 is attached and generally toward the ground, floor or other surface. The term "forwardly" refers to a direction toward the front side 72 of the apparatus 10 (i.e., toward the first/front lateral frame member 64 and the static container support member 88). The upper end of the first lip support member 164 is attached to or integral with the support plate 140 and the lower end of the first lip support member 164 is attached to or integral with the rearward end of the second lip support member 166. The lip engaging device 102 is attached to or integral with the forward end of the second lip support member 166 so as to be disposed generally facing, but in spaced apart relation to, the lip engaging member 98 of the static container support member 88. When the biasing mechanism 108 biases the dynamic support 100 towards the static container support member 88, the lip engaging device 102 will move toward the lip engaging member 98. When the storage container 14 is in the container space 92, the lip engaging member 98 and the lip engaging device 102 will, respectively, engage the first lip 44 and second lip 46 of the storage container 14. As will be readily understood by persons skilled in the art, the lip support assembly 144 can be configured in a variety of different manners using one or more lip support members. In one embodiment, the lip support assembly 144 can comprise a single generally curved lip support member that curves forward to direct the lip engaging device 102 towards the lip engaging member 98. Many other configurations are also possible for the lip support assembly 144.

As set forth above, both form and functionality are improved with the embodiment set forth in FIGS. 15-20. The spring 118 provides adequate, but not overbearing resistance and bias and the ball bearing wheels 154/156/158 provide for much smoother operation. As can be seen when comparing FIGS. 5 and 6 to FIGS. 15-17, there is also no need for excess width utilizing the configuration of the second embodiment, as the dynamic support members 100 do not need to be nearly as long or extend rearward as far (i.e., in order for the insert member 104 to be slidably received in the tubular receiver member 106) in order to facilitate the movement of the dynamic support members 100 and the overall functionality of the apparatus 10 with regard to receiving and supporting a storage container 14.

In addition to the improved overall ease of use and smaller profile of the apparatus of the second embodiment, this configuration enables implementation of a braking or locking system, shown as 168 in FIGS. 20-22, that provides a myriad of benefits for the apparatus 10. The locking system 168 is comprised of a locking frame 170, a handle 172 attached to a shaft 174 with a generally U-shaped offset portion 176 at or near the center of the shaft 174 and a locking biasing mechanism 178, which can be an extension spring 180, that attaches the offset portion 176 of the shaft 174 to a fixed position cross-member 182 of the locking frame 170, as best shown in FIGS. 21 and 22. The locking frame 170 is made up of two lateral members 184 and a plurality of transverse members 186. As shown in FIG. 20, the locking frame 170 is substantially the same width and length as the frame 62 that supports the dynamic supports 100. The transverse members are positioned along the locking frame 170 at the same measured intervals as the transverse frame members 68/70/71 on which the wheels 154/156/158 ride to provide mobility for the dynamic supports 100. Attached to the support plate 140 of the dynamic supports 100 opposite the side thereof with wheels 154/156/158 is a strip with grooves that, in effect, form "teeth" in the manner of a flat gear. An opposing section of this flat gear is installed along the length of the transverse members 186 of the locking frame 170. This entire locking frame 170 rides within a plurality of tubular supports 188 attached to or integral with the upper frame 62, as shown in FIG. 20. These tubular supports 188 are essentially short pieces of tubing in which the locking frame 170 has sufficient space to slide laterally, but which hold the entire locking frame 170 in place on a vertical plane. When the handle 172 is rotated by the user, the offset portion 176 of the shaft 174 rotates and pulls the spring 180, or other locking biasing mechanism 178, which is attached to the cross member 182 of the locking frame 170. This causes the locking frame to slide laterally, only stopping when at rest against the non-wheeled side of the support plate 140 of the dynamic support members 100. With the locking spring 180 nearly fully extended and exerting maximum pressure on the locking frame 170, the "teeth" on the support plate 140 of the dynamic supports engage the "teeth" on the cross member 182 of the locking frame 170. This interlocking of "teeth" inhibits movement of the dynamic supports 100 and locks any storage containers 14 in the container space 92 in whatever configuration they are in when the locking system 168 is engaged. An alternative to the "teeth" configuration would be rubber that grips upon contact with the surface, or with material on the surface, of the support plate 140 of the dynamic support 100. Another alternative configuration is the use of sharp spike like teeth on the support plate 140 of the dynamic supports 100 which digs in and grips a strip of rubber that is attached to the cross member 182 of the locking frame 170. As will be readily appreciated by persons skilled in the art, a number of different configurations of the locking system 168 can be utilized with the apparatus 10. The locking system 168 is particularly useful when using the apparatus 10 to secure storage containers 14 in a moving vehicle, such as a moving van or the like. Another useful benefit of utilizing the locking system 168 is that the apparatus 10 can be configured with a locking device so the user can lock the storage containers 14 in the apparatus 10, making it difficult for unauthorized persons or thieves to gain access to the items in the storage containers 14.

The apparatus 10 is attached to the area supports 52 in the garage, shed, room, closet or other area where the user would find it beneficial to store containers 14 above the floor and below the area supports 52. The apparatus 10 is attached using a connecting mechanism 58 appropriate for the materials of the apparatus 10 and area supports 52. In one embodiment, bolts, screws, nails or like connectors 60 are utilized to connect the upper frame 62 of the mounting section 50 to the area supports 52, such as a joist 54, ceiling 56 or the like. In the embodiment shown in FIGS. 3-4, 6, 8-9 and 13, the connectors 60 are received through the slot apertures 82 in the upper surface 80 of each of the first/front lateral frame member 64 and second/back lateral frame member 66. The embodiments of FIGS. 15-22 can also include the slot apertures 82, or other mechanisms to attach the mounting section 50 to the joists, 54, ceiling 56 or other area supports 52. In other embodiments, the lateral frame members 64/66 may be welded or otherwise fixedly attached, directly or indirectly, to the area supports 52 to secure the apparatus 10 in the desired location in the area.

To store storage containers 14 in the apparatus 10, the user places the bottom of one of the container lips, such as second lip 44, alongside the length of the lip engaging device 102 of the dynamic support 100 and applies pressure, via the container 14, to push the lip engaging device 102 rearward to increase the area in the container space 92 to open a gap larger than the width W of the container 14. For the embodiments of FIGS. 3-14, pushing the lip engaging device 102 rearward pushes against the insert member 104 and biasing member 108 of the dynamic support 100 to move the inset member 104 rearward in the tubular receiving member 106 to increase the amount of space in the container space 92. With regard to the embodiment of FIGS. 15-22, pushing the lip engaging device 102 rearward pushes moving mechanism 142 rearward along the transverse frame members 68/70/71. Once the container 14 is in the container space 92, the person allows the biasing mechanism 108 to push or pull the lip engaging device 102 and container 14 toward the static container support member 88 until the lip engaging member 98 of the static container support member 88 engages the container 14 just below the first lip 44 thereof. At that point, the width of the container space 92 will be slightly larger (very little) than the width W of the storage container 14, but smaller than the width at the lips 44/46, allowing the lip engaging member 98 of the static container support member 88 and the lip engaging device 102 of the dynamic container support assembly 90 to support the container 14 by the lips 44/46 in the container space 92 to removably store the storage container 14 in the apparatus 10. The bottom surface of the container lips 44/46 will be resting on the upper surface of the lip engaging member 98 and the lip engaging device 102, with the remaining portion of the container body 15, which will be most of the container 14, hanging below the apparatus 10. To remove a container 14, the person merely pushes the container 14 against the lip engaging device 102 of the dynamic support 100 to overcome the biasing force of the biasing mechanism 108 and increase the width of the container space 92. The person then takes the container lips 44/46 off of the lip engaging member 98 and the lip engaging device 102 to remove the container 14 from the apparatus 10. The biasing force of the biasing mechanism 108 will push the lip engaging device 102 back into the container space 92. In the embodiment of FIGS. 3-14, the biasing stop member 110 will prevent the second end 114 of the insert member 104 from entering into and passing through the tubular receiver member 106.

The apparatus 10 and system 12 of the present invention make it easier and more efficient to organize containers 14 in a garage, shed, room, closet or other area where such containers 14 will be stored, particularly for items stored therein that are only occasionally utilized. Specifically, the apparatus 10 and system 12 of the present invention allow a person to better organize the storage of containers 14 by utilizing previously unutilized or inconveniently or inefficiently used space below the ceiling 56 or roof above the area. The new apparatus 10 and system 12 allow the person to easily, quickly and efficiently place, store and retrieve containers 14. As set forth above, the apparatus 10 is configured to allow a person to retrieve a storage container 14 from any place in the container space 92 between the dynamic supports 100 of the dynamic container support assembly 90 and the static container support member 88 without having to move additional storage containers 14. Unlike prior art storage container organizers, particularly the I-beam type, the apparatus 10 of the present invention does not require an open end to slide the containers 14 onto the spaced apart flanges of the apparatus 10. Instead, a storage container 14 can be placed into the apparatus 10 at any location where there is an empty spot in the container space 92. Because there is no need to measure the containers 14 and it is not necessary to carefully position the opposing I-beams, for the prior art system, the apparatus 10 and system 12 are much easier to install and use than prior art apparatuses and systems.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A container storage apparatus for storing one or more storage containers below one or more area supports, each storage container having a container body with a first lip and a second lip extending outward from opposing walls of the container body, said apparatus comprising:

a mounting section having an upper frame structured and arranged to attach said apparatus to at least one of the one or more area supports, said upper frame comprising a first lateral frame member at a front side of said apparatus, a second lateral frame member at a back side of said apparatus and one or more transverse frame members disposed between said first lateral frame member and said second lateral frame member, said second lateral frame member being disposed in spaced apart relation to said first lateral frame member, wherein at least one of said first lateral frame member and said second lateral frame member have an upper surface configured to be attached to the one or more area supports; and a container engaging section attached to or integral with said mounting section, said container engaging section structured and arranged to engage the container body so as to position the storage container in a container space of said container engaging section, said container engaging section comprising a static container support member and a dynamic container support assembly, said static container support member attached to or integral with one of said first lateral frame member and said transverse frame members, said dynamic container storage assembly having one or more dynamic supports, each of said dynamic supports moveably engaged with one of said one or more transverse frame members in spaced apart relation to said static container support member so as to define said container space therebetween, said static container support member and said dynamic container support assembly configured to support the storage container in said container space generally below said mounting section.

2. The apparatus of claim 1, wherein each of said dynamic supports having a biasing mechanism associated with said one of said one or more transverse frame members and a lip support assembly moveably supported on said one of said one or more transverse members so as to be biased by said biasing mechanism toward said static container support member to engage and support the storage container therebetween.

3. The apparatus of claim 2, wherein said static container support member has a lip engaging member sized and configured to engagedly support the first lip of the container body and said lip support assembly has a lip engaging device sized and configured to engagedly support the second lip of the container body to securely hold the storage container between said lip engaging member of said static container storage member and said lip engaging device of said lip support assembly so as to removably support the storage container.

4. The apparatus of claim 2, wherein each of said dynamic supports comprises a moving mechanism configured to moveably engage said one of said one or more transverse frame members so as to move said dynamic support along said one of said one or more transverse frame members.

5. The apparatus of claim 4, wherein each of said dynamic supports further comprises a support plate interconnecting said moving mechanism, said biasing mechanism and said lip support assembly, said biasing mechanism configured to bias said support plate, moving mechanism and said lip support assembly toward said static container support member so as to securely engage the support container in said container space.

6. The apparatus of claim 4, wherein said moving mechanism comprises one or more wheels engaged with said one of said one or more transverse frame members.

7. The apparatus of claim 2, wherein each of said dynamic supports further comprises a support plate interconnecting said biasing mechanism and said lip support assembly, said support plate moveably supported on said one of said one or more lateral frame members and biased by said biasing mechanism so as to move said lip support assembly toward said static container support member.

8. The apparatus of claim 2, wherein said lip support assembly has one or more lip support members.

9. The apparatus of claim 1 further comprising a locking system, said locking system structured and arranged to engage said dynamic container support assembly and prevent movement of said dynamic supports along said one of said one or more transverse members so as to prevent removal of the storage container from said container space of said apparatus.

10. The apparatus of claim 9, wherein said locking system comprises a locking frame associated with said upper frame, a shaft connected to said locking frame and a handle connected to said shaft, said locking system configured to engage one or more of said dynamic supports so as to prevent movement of said dynamic support along said one of said one or more transverse members.

11. A container storage apparatus for storing one or more storage containers below one or more area supports, said apparatus comprising:
a container engaging section structured and arranged to engage a first lip and a second lip of a container body of the storage container so as to position the storage container in a container space of said container engaging section, the first lip and the second lip disposed on opposing walls of the container body, said container engaging section comprising a static container support member and a dynamic container storage assembly in spaced apart relation to said static container support member to define said container space therebetween, said static container support member having a lip engaging member sized and configured to engagedly support the first lip of the container body, said dynamic container storage assembly having a plurality of dynamic supports, each of said dynamic supports having a lip engaging device and a biasing mechanism, said dynamic supports configured to dispose said lip engaging device into said container space, said lip engaging device sized and configured to engagedly support the second lip of the container body, said biasing mechanism configured to bias said lip engaging device toward said lip engaging member of said static container storage member to securely hold the storage container between said lip engaging member of said static container storage member and said lip engaging device of one of said one or more dynamic supports to removably support the storage container in said apparatus; and
a mounting section having an upper frame structured and arranged to attach said apparatus to at least one of the one or more area supports and to support said container engaging section, said upper frame comprising a first lateral frame member at a front side of said apparatus, a second lateral frame member at a back side of said apparatus and one or more transverse frame members disposed between said first lateral frame member and said second lateral frame member, at least one of said first lateral frame member and said second lateral frame member have an upper surface configured to be attached to the one or more area supports, said second lateral frame member being disposed in spaced apart relation to said first lateral frame member, each of said dynamic supports moveably engaged with one of said one or more transverse frame members so as to be biased toward said front side of said apparatus to hold the storage container in said container space and to be moved toward said back side of said apparatus to place the storage container in said container space or to remove the storage container from said container space.

12. The apparatus of claim 11, wherein each of said dynamic supports has a support plate, a moving mechanism associated with said support plate and a lip support assembly interconnecting said support plate and said lip engaging device, said moving assembly moveably engaging said support plate with said one of said one or more transverse frame members so as to move said lip engaging device toward or away from said lip engaging member.

13. The apparatus of claim 11 further comprising a locking system, said locking system structured and arranged to engage said dynamic container support assembly and prevent movement of said dynamic supports along said one of said one or more transverse members so as to prevent removal of the storage container from said container space of said apparatus.

14. The apparatus of claim 13, wherein said locking system comprises a locking frame associated with said upper frame, a shaft connected to said locking frame and a handle connected to said shaft, said locking system configured to engage one or more of said dynamic supports so as to prevent movement of said dynamic support along said one of said one or more transverse members.

15. A container storage system, comprising:

one or more area supports;

one or more containers, each of said one or more containers having a container body with a plurality of walls, a first lip on one of said plurality of walls and a second lip on an opposing wall of said plurality of walls, each of said first lip and said second lip extending outward from said container body; and an apparatus for storing said one or more storage containers below said one or more area supports, said apparatus comprising a container engaging section and a mounting section, said container engaging section structured and arranged to engage said first lip and said second lip of said container body of said storage container so as to position said storage container in a container space of said container engaging section, said container engaging section comprising a static container support member and a dynamic container storage assembly in spaced apart relation to said static container support member so as to define said container space therebetween, said static container support member having a lip engaging member sized and configured to engagedly support said first lip of said container body, said dynamic container storage assembly having one or more dynamic supports, each of said dynamic supports having a lip engaging device and a biasing mechanism, said dynamic supports configured to dispose said lip engaging device in said container space, said lip engaging device sized and configured to engagedly support said second lip of said container body, said biasing mechanism configured to bias said lip engaging device toward said lip engaging member of said static container storage member to securely hold the storage container between said lip engaging member of said static container storage member and said lip engaging device of one of said one or more dynamic supports so as to removably support said storage container in said apparatus, said mounting section having an upper frame with one or more frame members, at least one of said one or more frame members having an upper surface structured and arranged to attach said apparatus to at least one of said one or more area supports, said upper frame attached to or integral with said container engaging section so as to position said dynamic container support assembly in spaced apart relation to said static container support member and dispose the storage container below the area supports when the storage container is in said storage space.

16. The system of claim 15, wherein each of said one or more dynamic supports has a support plate, a moving mechanism associated with said support plate and a lip support assembly interconnecting said support plate and said lip engaging device, said moving assembly moveably engaging said support plate with said one of said one or more transverse frame members so as to move said lip engaging device toward or away from said lip engaging member.

17. The system of claim 15 further comprising a locking system, said locking system structured and arranged to engage said dynamic container support assembly and prevent movement of said dynamic supports along said one of said one or more transverse members so as to prevent removal of the storage container from said container space of said apparatus.

18. The system of claim 17, wherein said locking system comprises a locking frame associated with said upper frame, a shaft connected to said locking frame and a handle connected to said shaft, said locking system configured to engage one or more of said dynamic supports so as to prevent movement of said dynamic support along said one of said one or more transverse members.

19. The system of claim 15, wherein said dynamic container support assembly comprises a plurality of said dynamic supports so as to secure a plurality of said containers in said apparatus.

* * * * *